United States Patent
Hartl

(10) Patent No.: US 11,462,789 B2
(45) Date of Patent: Oct. 4, 2022

(54) BASE BODY FOR FEEDING THROUGH OF A CONDUCTOR, AND A HOUSING COMPONENT OF A HOUSING, IN PARTICULAR A BATTERY HOUSING COMPRISING SAID BASE BODY

(71) Applicant: Schott AG, Mainz (DE)

(72) Inventor: Helmut Hartl, Weidling/Klosterneuburg (AT)

(73) Assignee: Schott AG, Mainz (DE)

( * ) Notice: Subject to any disclaimer, the term of this patent is extended or adjusted under 35 U.S.C. 154(b) by 491 days.

(21) Appl. No.: 16/447,142

(22) Filed: Jun. 20, 2019

(65) Prior Publication Data

US 2019/0312239 A1 Oct. 10, 2019

Related U.S. Application Data

(63) Continuation of application No. PCT/EP2017/082001, filed on Dec. 8, 2017, which is
(Continued)

(30) Foreign Application Priority Data

Feb. 18, 2011 (DE) ...................... 10 2011 011 705.9
Feb. 25, 2011 (DE) ...................... 10 2011 012 430.6
(Continued)

(51) Int. Cl.
*H01M 50/186* (2021.01)
*H01M 10/0525* (2010.01)
(Continued)

(52) U.S. Cl.
CPC .......... *H01M 50/186* (2021.01); *H01G 11/80* (2013.01); *H01G 11/82* (2013.01);
(Continued)

(58) Field of Classification Search
CPC ............. H01M 50/186; H01M 50/191; H01M 10/0525; H01G 11/80; H01G 11/82; H01G 11/84
See application file for complete search history.

(56) References Cited

U.S. PATENT DOCUMENTS 563,694 A 7/1896 Thomas
961,672 A 6/1910 Barnhurst
(Continued)

FOREIGN PATENT DOCUMENTS

CN 202772203 U 3/2013
CN 103346274 A 10/2013
(Continued)

OTHER PUBLICATIONS

JP48070641A abstract (Year: 1973).*
(Continued)

*Primary Examiner* — Jane J Rhee
(74) *Attorney, Agent, or Firm* — Taylor IP, P.C.

(57) ABSTRACT

A base body includes at least one opening through which at least one functional element surrounded by a glass or glass ceramic material is fed through the opening of the base body for connection with a housing comprising a light metal, in particular aluminum. The base body consists at least partially of a light metal, such as a light metal alloy which has a yield point greater than $40^N/mm^2$ when heated to temperatures higher than 520° C. to a maximum of 560° C. for longer than 1 to 60 minutes.

20 Claims, 6 Drawing Sheets

Related U.S. Application Data a continuation-in-part of application No. 15/385,166, filed on Dec. 20, 2016, now Pat. No. 10,224,521, which is a continuation-in-part of application No. 13/967,870, filed on Aug. 15, 2013, now Pat. No. 9,616,518, which is a continuation of application No. PCT/EP2012/000698, filed on Feb. 17, 2012.

(30) Foreign Application Priority Data

| Apr. 1, 2011 | (DE) | .................... | 10 2011 015 869.3 |
|---|---|---|---|
| Jun. 10, 2011 | (DE) | .................... | 10 2011 103 975.2 |
| Jun. 10, 2011 | (DE) | .................... | 10 2011 103 976.0 |
| Jul. 7, 2011 | (DE) | .................... | 10 2011 106 873.6 |

(51) Int. Cl.
*H01G 11/80* (2013.01)
*H01G 11/84* (2013.01)
*H01G 11/82* (2013.01)
*H01M 50/191* (2021.01)

(52) U.S. Cl.
CPC ........ *H01G 11/84* (2013.01); *H01M 10/0525* (2013.01); *H01M 50/191* (2021.01)

(56) References Cited

U.S. PATENT DOCUMENTS

| 3,005,865 | A | 10/1961 | Jonsson |
| 4,212,930 | A | 7/1980 | Athearn |
| 4,217,403 | A | 8/1980 | O'Boyle et al. |
| 4,219,362 | A | 8/1980 | Colegrove |
| 4,358,514 | A | 11/1982 | Garoutte et al. |
| 4,565,093 | A | 1/1986 | Jurva et al. |
| 4,841,101 | A | 6/1989 | Pollock |
| 5,015,530 | A | 5/1991 | Brow et al. |
| 5,262,364 | A | 11/1993 | Brow et al. |
| 5,773,959 | A | 6/1998 | Merritt et al. |
| 5,849,434 | A | 12/1998 | Miura et al. |
| 5,853,914 | A | 12/1998 | Kawakami |
| 5,874,185 | A | 2/1999 | Wang et al. |
| 5,900,183 | A | 5/1999 | Kronfli et al. |
| 5,952,126 | A | 9/1999 | Lee et al. |
| 6,159,630 | A | 12/2000 | Wyser |
| 6,180,279 | B1 | 1/2001 | Kinuta |
| 6,344,292 | B1 | 2/2002 | Nemoto et al. |
| 6,475,669 | B2 | 11/2002 | Probst et al. |
| 6,569,562 | B1 | 5/2003 | Spillman et al. |
| 7,294,430 | B2 | 11/2007 | Wyser |
| 7,335,443 | B2 | 2/2008 | Magneron |
| 7,687,200 | B2 | 3/2010 | Jouanneau-Si-Larbi et al. |
| 9,518,810 | B1 | 12/2016 | Burrow |
| 2002/0031949 | A1 | 3/2002 | Miyazaki |
| 2003/0134194 | A1 | 7/2003 | Lasater |
| 2004/0062985 | A1 | 4/2004 | Aamodt |
| 2004/0231877 | A1 | 11/2004 | Wolf et al. |
| 2004/0258988 | A1* | 12/2004 | Nielsen ............... H01M 50/543 429/181 |
| 2005/0284919 | A1 | 12/2005 | Boyd |
| 2008/0224102 | A1 | 9/2008 | Lee et al. |
| 2013/0330599 | A1 | 12/2013 | Kroll et al. |
| 2014/0099533 | A1 | 4/2014 | Hartl |
| 2014/0106210 | A1 | 4/2014 | Deng et al. |
| 2015/0197072 | A1 | 7/2015 | Shimizu et al. |

FOREIGN PATENT DOCUMENTS

| DE | 27 33 948 A1 | 8/1978 |
| DE | 690 23 071 T2 | 6/1996 |
| DE | 101 05 877 A1 | 8/2001 |
| DE | 698 04 378 T2 | 10/2002 |
| DE | 699 23 805 T2 | 7/2005 |
| DE | 10 2009 011 182 A1 | 9/2010 |
| DE | 10 2011 012 430 A1 | 8/2012 |
| EP | 0 035 074 A2 | 9/1981 |
| EP | 0 412 655 A2 | 2/1991 |
| EP | 0 885 874 A1 | 12/1998 |
| EP | 0 954 045 A2 | 11/1999 |
| FR | 2 585 185 | 1/1987 |
| JP | 55-117864 A | 9/1980 |
| JP | 11-176399 A | 7/1999 |
| SU | 1 058 909 A1 | 12/1983 |
| WO | 2012/110242 A1 | 8/2012 |
| WO | 2012/110244 A1 | 8/2012 |

OTHER PUBLICATIONS

Extended European Search Report dated Sep. 23, 2019 for European Patent Application No. 19 18 0797 (5 pages).
"Handbook of Batteries", published by David Linden, 2nd issue, McGrawhill, 1995, Chapters 36 & 39 (88 pages).
R. Gorke, K.J. Leers: Keram.Z.48 (1996), "Automatisierung eines Erhitzungsmikroskops mit Hilfe digitaler Bildverarbeitung", pp. 300-305 (6 pages).
International Search Report and Written Opinion dated Oct. 2, 2018 for International Application No. PCT/EP2017/082001 (35 pages).
Korean Office Action, including an English translation thereof, dated Feb. 27, 2018 for Korean Patent Application No. 10-2013-7022159 (14 pages).
International Search Report dated Jun. 25, 2012 for International Application No. PCT/EP2012/000698 (4 pages).
DIN 51730, Testing of solid fuels—Determination of fusibility of fuel ash, Sep. 2007 (16 pages).
ISO 540, Hard coal and coke—Determination of ash fusibility, International Standard, Fourth edition, Jun. 1, 2008 (20 pages).
DIN CEN/TS 15404, Solid recovered fuels—Methods for the determination of ash melting behaviour by using characteristic temperatures, Nov. 2010 (19 pages).
DIN CEN/TS 15370-1, Solid biofuels—Method for the determination of ash melting behaviour—Part 1: Characteristic termperatures method, Dec. 2006 (12 pages).
Notification Concerning Transmittal of International Preliminary Report on Patentability and Written Decision of the International Searching Authority dated Aug. 29, 2013 for International Application No. PCT/EP2012/000698 (6 pages).
Notification Concering Tranmittal of International Preliminary Report on Patentability dated Jul. 4, 2019 (30 pages).
Notification of Transmittal of Translation of the International Preliminary Report on Patentability dated Jul. 4, 2019 (20 pages).
Chinese Search Report dated Oct. 11, 2021 for Chinese Application No. 2017800791955 (2 pages).

* cited by examiner

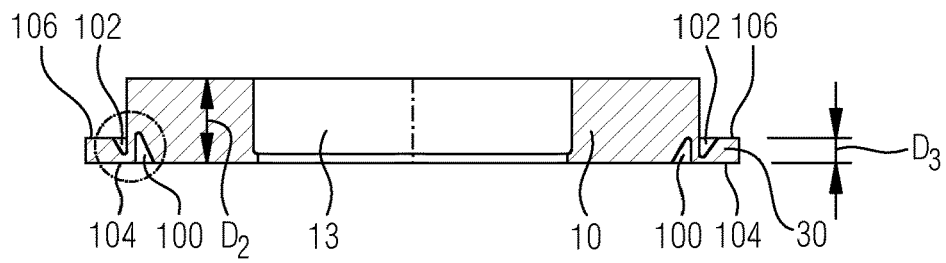
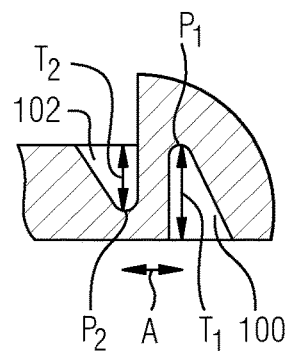
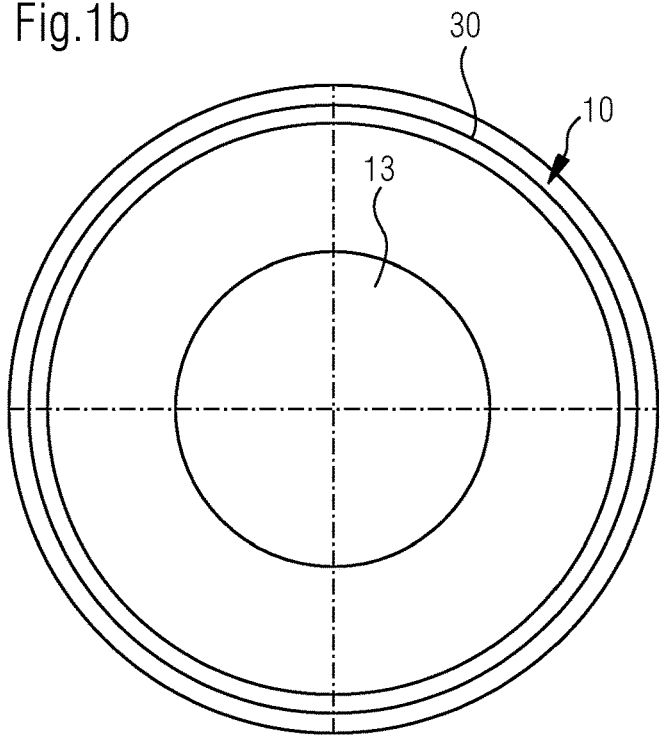
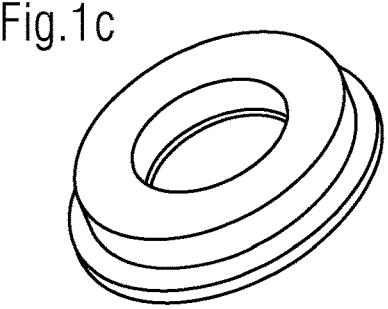

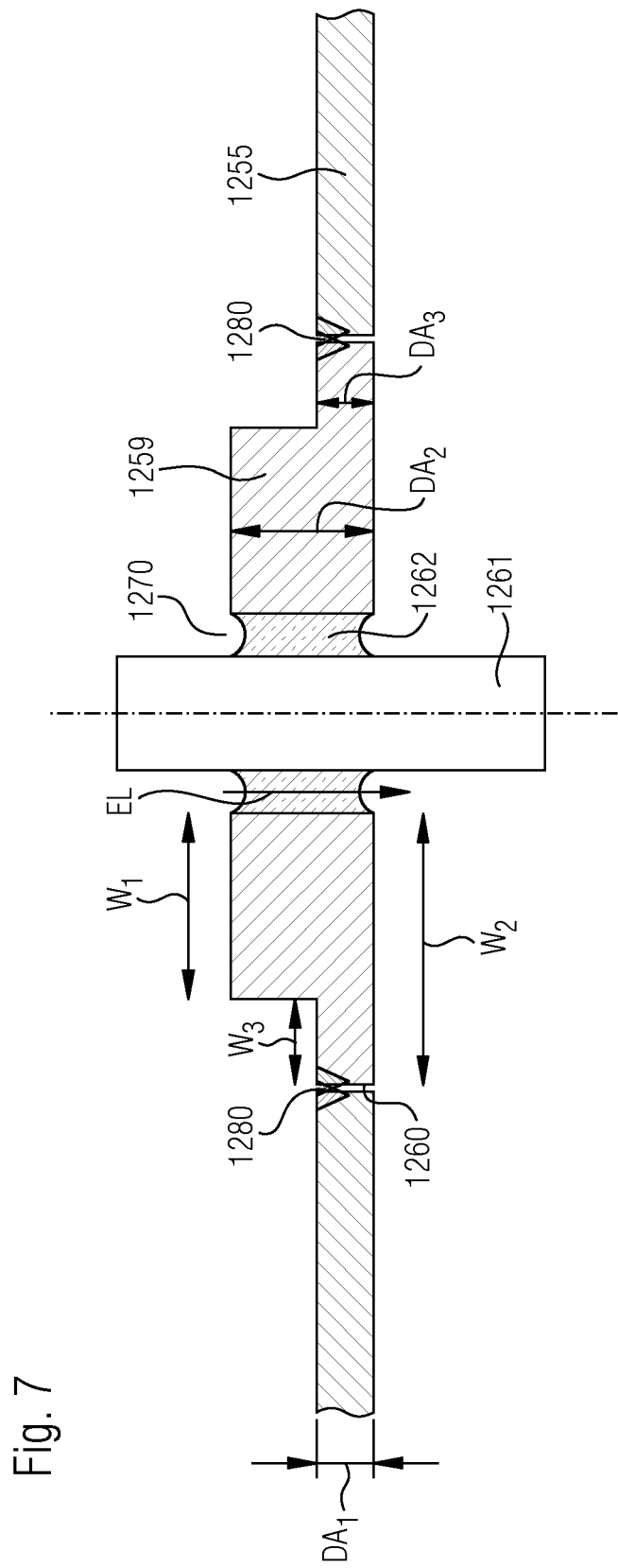

BASE BODY FOR FEEDING THROUGH OF A CONDUCTOR, AND A HOUSING COMPONENT OF A HOUSING, IN PARTICULAR A BATTERY HOUSING COMPRISING SAID BASE BODY

CROSS REFERENCE TO RELATED APPLICATIONS

This is a continuation of PCT application No. PCT/EP2017/082001, entitled "BASE BODY FOR FEEDING THROUGH OF A CONDUCTOR, AND A HOUSING COMPONENT OF A HOUSING, IN PARTICULAR A BATTERY HOUSING COMPRISING SAID BASE BODY", filed Dec. 8, 2017, which is incorporated herein by reference. PCT application No. PCT/EP2017/082001 is a continuation in part of U.S. patent application Ser. No. 15/385,166, entitled "FEED-THROUGH", filed Dec. 20, 2016, which has issued as U.S. Pat. No. 10,224,521. U.S. patent application Ser. No. 15/385,166 is a continuation in part of U.S. patent application Ser. No. 13/967,870, entitled "FEED-THROUGH", filed Aug. 15, 2013, which has issued as U.S. Pat. No. 9,616,518. U.S. patent application Ser. No. 13/967,870 is a continuation of PCT application No. PCT/EP2012/000698, entitled "FEED-THROUGH", filed Feb. 17, 2012, all of which are incorporated herein by reference.

BACKGROUND OF THE INVENTION

1. Field of the Invention

The invention relates to a base body for feeding through of a functional element, and a housing component of a housing, in particular a battery housing comprising said base body, wherein the housing component has at least one opening to accommodate the base body. At least one conductor, in particular a substantially pin shaped conductor is fed in a glass or glass ceramic material through the base body.

2. Description of the Related Art

In the sense of the current invention, batteries are understood to be disposable batteries which are disposed of and/or recycled after their use, as well as also an accumulator.

As is generally known, super capacitors, also referred to as "super caps," are electrochemical energy accumulators with especially high output density. Super capacitors, in contrast to ceramic-, film- and electrolytic capacitors are not a dielectric in the conventional sense. In particular, they actualize the storage principles of static storage of electric energy by charge separation in a double layer capacitance and also the electrochemical storage of electric energy by charge exchange with the assistance of redox reaction in a pseudo capacity.

Super capacitors comprise in particular hybrid capacitors, especially lithium-ion-capacitors. Their electrolyte comprises normally a solvent in which conductible salts, normally lithium salts are dissolved. Super capacitors are generally used in applications where large amounts of energy are required for a relatively short time or for a very high number of charge and discharge cycles. Super capacitors are used especially advantageously in the automotive sector in particular in the area of recuperation of braking energy. Other applications are also possible and are covered by the current invention.

Accumulators, preferably lithium-ion batteries are intended for various applications, for example for portable electronic equipment, cell phones, power tools and in particular electric vehicles. The batteries can replace traditional energy sources, for example lead-acid batteries, nickel-cadmium batteries or nickel-metal hydride batteries.

Lithium-ion batteries have been known for many years. In this regard, reference is made to the "Handbook of Batteries, published by David Linden, 2nd issue, McGrawhill, 1995, chapter 36 and 39".

Various aspects of lithium-ion batteries are described in a multitude of patents, for example U.S. Pat. Nos. 961,672; 5,952,126; 5,900,183; 5,874,185; 5,849,434; 5,853,914; as well as U.S. Pat. No. 5,773,959.

Lithium-ion batteries, in particular for applications in the automobile industry generally feature a multitude of individual battery cells which are generally connected in-series. The in-series connected battery cells are usually combined into so-called battery packs and then to a battery module which is also referred to as lithium-ion battery. Each individual battery cell has electrodes which are led out of a housing of the battery cell. The same applies to the housings of super capacitors.

In particular in the use of lithium-ion batteries and/or capacitors and/or super capacitors in preferably the automobile industry, a multitude of problems such as corrosion resistance, stability in accidents or vibration resistance must be solved. An additional problem is the seal, in particular the hermetic seal of the battery cells and/or housings of capacitors and/or super capacitors over an extended period of time. The seal may, for example, be compromised by leakage in the region of the electrodes of the battery cell or respectively the electrode feedthrough of the battery cell and/or the housing of capacitors and/or super capacitors. Such leakages may for example be caused by temperature changes and alternating mechanical stresses, for example vibrations in the vehicle or aging of the synthetic material. A short-circuit or temperature changes in the battery or respectively battery cell can lead to a reduced life span of the battery or the battery cell. Equally as important is the impermeability of the seal in accident and/or emergency situations.

In order to ensure better stability in accidents, a housing for a lithium-ion battery is suggested for example in DE 101 05 877 A1, whereby the housing includes a metal jacket which is open on both sides and which is being sealed. The power connection or respectively the electrodes are insulated by plastic. A disadvantage of the plastic insulations is the limited temperature resistance, the limited mechanical stability, aging and the unreliable dependability of the seal over the service life. The feedthroughs in the lithium-ion batteries according to the current state of the art are therefore not integrated hermetically sealed into the cover part of the Li-ion battery. Moreover, the electrodes are crimped, and laser welded connecting components with additional insulators in the interior of the battery.

An additional problem with the lithium-ion batteries according to the prior art was that the battery cells occupied a large space and because of the high currents due to resistance losses, heat and temperature changes occurred quickly.

An alkaline battery has become known from DE 27 33 948 A1 wherein an insulator, for example glass or ceramic is joined directly by a fusion seal with a metal component. One of the metal parts is connected electrically with an anode of the alkaline battery and the other is connected electrically with a cathode of the alkaline battery. The metals used in DE 27 33, 948 A1 are iron or steel. Light metals like aluminum are not described in DE 27 33 948 A1. Also, the sealing temperature of the glass or ceramic material is not specified in DE 27 33 948 A1. The alkaline battery described in DE 27 33 948 A1 is a battery with an alkaline electrolyte which, according to DE 27 33 948 A1 contains sodium hydroxide or potassium hydroxide. Li-ion batteries are not mentioned in DE 27 33 948 A1.

A method to produce asymmetrical organic carboxylic acid esters and to produce anhydrous organic electrolytes for alkali-ion batteries has become known from DE 698 04 378 T2 or respectively EP 0885 874 B1. Electrolytes for rechargeable lithium-ion cells are also described in DE 698 04 378 T2 or respectively EP 0 885 874 B1.

Materials for the cell pedestal which receives the through-connection are not described; only materials for the connecting pin which may consist of titanium, aluminum, a nickel alloy or stainless steel.

An RF feedthrough with improved electrical efficiency is described in DE 699 23 805 T2 or respectively EP 0 954 045 B1. The feedthroughs known from DE 699 23 805 T2 or respectively EP 0 954 045 B1 are not glass-metal feedthroughs. Glass-metal feedthroughs which are provided immediately inside for example the metal wall of a packing, are described in EP 0 954 045 B1 as being disadvantageous since RF feedthroughs of this type are not durable due to embrittlement of the glass.

DE 690 230 71 T2 or respectively EP 0 412 655 B1 describes a glass-metal feedthrough for batteries or other electro-chemical cells, whereby glasses having a $SiO_2$ content of approximately 45 weight-% are being used and metals, in particular alloys are being used which contain molybdenum and/or chromium and/or nickel. The use of light metals is also insufficiently addressed in DE 690 230 71 T2, as are sealing temperatures or bonding temperatures for the used glasses. According to DE 690 230 71 T2 or respectively EP 0 412 655 B1 the materials used for the pin-shaped conductor are alloys which contain molybdenum, niobium or tantalum.

A glass-metal feedthrough for lithium-ion batteries has become known from U.S. Pat. No. 7,687,200. According to U.S. Pat. No. 7,687,200 the housing was produced from high-grade steel and the pin-shaped conductor from platinum/iridium. The glass materials cited in U.S. Pat. No. 7,687,200 are glasses TA23 and CABAL-12. According to U.S. Pat. No. 5,015,530 these are $CaO$—$MgO$—$Al_2O_3$—$B_2O_3$ systems having sealing temperatures of 1025° C. or 800° C. Moreover, glass compositions for glass-metal feedthroughs for lithium batteries have become known from U.S. Pat. No. 5,015,530 which contain $CaO$, $Al_2O_3$, —$B_2O_3$, $SrO$ and $BaO$ whose sealing temperatures are in the range of 650° C.-750° C. and which are therefore too high for use with light metals.

A feedthrough has become known from U.S. Pat. No. 4,841,101 wherein an essentially pin-shaped conductor is sealed into a metal ring with a glass material. The metal ring is then again inserted into an opening or bore in a housing and is joined material to material with the interior wall or respectively the bore through welding, for example after interlocking of a welding ring. The metal ring consists of a metal which has essentially the same or similar thermal coefficient of expansion as the glass material in order to compensate for the high thermal coefficient of expansion of the aluminum of the battery housing. In the design variation described in U.S. Pat. No. 4,841,101 the length of the metal ring is always shorter than the bore or opening in the housing.

No references are made in U.S. Pat. No. 4,841,101 to the glass compositions, neither is a special application described for the feedthrough, for example for batteries, in particular Li-ion accumulators.

From WO 2012/110242 A4 a feedthrough is known, particularly through a housing component of a housing, in particular a battery housing, preferably one of metal, in particular a light metal, preferably aluminum, an aluminum alloy, carbide, magnesium, a magnesium alloy, titanium, a titanium alloy, steel, stainless steel or high grade steel, wherein a conductor is sealed into a base body, for example with a glass or glass ceramic material, and wherein the base body with the conductor which is sealed into it is inserted into an opening of the housing component. WO 2012/110242 A4 describes joining the base body with the glazed conductor in the housing component by laser welding. For this purpose in WO 2012/110242 A4, the base body is welded by laser onto the housing cover of the housing component.

A base body is also shown in WO 2012/110242 A4 which is equipped with stress relief devices, for example grooves. Such a base body, that is equipped with grooves is however inserted into the opening and is connected with the side wall of the opening. It is known from WO 2012/110242 A4 to join such base bodies that having a circumferential groove as the stress relief device over the entire thickness, with the housing component by means of a welding process. WO 2012/110242 A4 moreover shows only one single circumferential groove as the stress relief device in the base body.

In the embodiment according to WO 2012/110242 A4 it was disadvantageous that during laser welding, fusion must occur along the interface of the base body and the housing component. This process is difficult to control, since the laser beam must follow the contour of the cut-out in the housing component and/or the base body very precisely. In particular when using light metals as the material for the housing component and also as the material for the base body it became evident that in the case of imprecise process control and/or variation of the energy of the laser beam, errors can occur in the seal. The performance of the laser beam results in a high thermal input into the glass and/or glass ceramic material. The hot welding zone moreover leads to stresses. Thus the base body expands due to the thermal input, whereas in contrast the glass and/or glass ceramic material remains substantially unchanged. The tensile stress of the base body resulting therefrom acts against the compressive stress of the glass and/or glass ceramic material upon the base body and results in leaks in the glass and/or glass ceramic material. Generally, welding, in particular laser welding of base body with a housing component consisting of light metal, in particular aluminum is problematic. This is especially true if sealing into the base body occurred through compression sealing. The inventors recognized that during welding of an aluminum component, for example an aluminum base body with a glass and/or glass ceramic feedthrough, an additional problem may occur. Especially if—as described above—a pressure glass seal is performed. This is the case if the coefficient of expansion of glass and/or glass ceramic material and the surrounding metal is different and the metal, for example aluminum exerts pressure and thus stress onto the glass material. As a result of welding, the aluminum surrounding the glass material may lose its strength or its strength may at least be reduced to such an extent that it is no longer sufficient to exert a sufficiently high pressure onto the glass material. As a result, the feedthrough will not be tightly sealed. This is to be attributed to the fact that under the influence of high temperatures, the aluminum softens and loses its strength, so that the necessary pressure upon the glass material can no longer be generated.

What is needed in the art is a base body and a component, in particular a housing component with such a base body with which the problems of the prior art can be avoided.

SUMMARY OF THE INVENTION

According to the present invention, it has been recognized that—for glazing a glass and/or glass ceramic material into a base body consisting at least partially of a light metal, in particular aluminum—the light metal must have certain properties, in particular strength. One very significant property is herein the yield point of the material of the body, in particular the base body into which the glazing is to occur. The yield point is a material parameter and identifies the stress point up to which a material displays no permanent deformation during uniaxial and torque-free stress. Below the yield point the material will return elastically to its original shape after relieving the stress. However, above the yield point a change in shape, that is an elongation, remained on a sample. Instead of the yield point for materials, a 0.2% yield strength or elasticity limit $R_{p0.2}$ can be specified. In contrast to the yield point, the elasticity limit can always be clearly determined from the nominal stress/total elasticity diagram. The 0.2% yield strength is the (uniaxial) mechanical stress wherein the remaining elasticity relative to the starting length of the sample after stress relief is exactly 0.2%. With absolutely pure aluminum, the yield point is at 17 N/mm$^2$, with commercial aluminum it increases to 34 N/mm$^2$. For aluminum alloys it can be up to 400 N/mm$^2$ depending on the alloy elements. The yield point is measured by means of known methods. The yield point is easily determined by a tensile test. Such a tensile test is the tensile test ISO 6892 with which the yield point or elasticity limit $R_{p0.2}$ is determined. The tensile test on metal according to ISO 6892 is generally performed on a universal testing machine/tension testing machine. One must differentiate between the yield point of aluminum or aluminum alloys in original state at room temperature and after a temperature treatment, for example heating during glazing and/or as described during sealing. The invention therefore includes housing components and/or base bodies to create a feed-through, in particular a glass and/or glass ceramic feed-through, wherein the housing components and/or the base bodies include metals, in particular light metals which still retain a sufficiently high yield point after heating. During glazing, heating may occur to temperatures in the range of 450° C. to 600° C., in particular 520° C. to 560° C. For example, heating to approximately 540° C. occurs during the glazing process.

The aforementioned base body can be joined with a component, in particular a housing component. The component, in particular the housing component may consist of a light metal and the connection with the base body occurs, for example, by a welded connection.

It has been recognized that the welded connection advantageously exhibited certain material compositions in order to provide a reliable seal. The welded connection has in particular a different material composition than that of the individual components that are being welded. Exemplary embodiments provided in accordance with the invention therefore comprise certain materials for base bodies, geometries of base bodies and corresponding geometries and materials of components, in particular housing components, which will be described below in further detail. This recognition is generally transferable to welded connections of light metal components.

When welding the base body together with the housing component, the glazing can be damaged by thermally induced mechanical loads. Some exemplary embodiments provided according to the present invention comprise a base body which includes elements, in particular geometric elements, which reduce the load on the glazing during sealing of the base body into the housing component at least to the extent that a reliable glazing is obtained even after establishing the welded connection.

In some embodiments, the housing component for accommodation of the base body is configured such that it interacts optimally with the previously described base body and/or the previously described materials. These embodiments include in particular suitable shapes in the region of the housing component that is intended for accommodation of the base body.

All individual aspects of the invention interact in individual combinations or especially advantageously also collectively synergistically, in order to provide a reliable, sealed and rationally producible feedthrough through a light metal housing component.

According to the invention, a base body is provided having at least one opening through which at least one functional element is guided. The functional element is generally an electric conductor, in particular a substantially pin-shaped conductor. The functional element can also be a mechanical retainer, a thermoelement, a fiber optic cable, etc. The functional element is retained in a glass and/or glass ceramic material in the opening of the base body and is inserted through same.

According to the invention, the body, in particular the base body according to some exemplary embodiments of the invention, comprises a light metal, in particular an aluminum alloy with a yield point of—after heating to temperatures of higher than 520° C. to a maximum of 560° C. for 1 to 60, such as 5 to 30 minutes—greater than 40$^N$/mm$^2$, such as greater than 50$^N$/mm$^2$, especially greater than 80$^N$/mm$^2$, such as in the range of 80$^N$/mm$^2$ to 150$^N$/mm$^2$. It has been found surprisingly that the light metals, in particular aluminum, such as aluminum alloys provide sufficient compression for hermetically sealed pressure seals only if they possess the characteristics outlined above. Due to the yield point, aluminum alloys that have an Mg content of more than 0.5 weight-%, such as more than 1 weight-%, in particular more than 2.5 weight-% to a maximum of 8 weight-%, such as to a maximum of 5.0 weight-%, may be used. Exemplary aluminum alloys include 4.0-4.9 weight-% Mg, 0.4-1 weight-% Mn and 0.05-0.25 weight-% Cr. Glazing can be performed into a light metal base body which is then inserted into the opening of a housing. Alternatively it is possible to glaze the conductor directly into the opening of the housing. In that case the housing may consist of a light metal, in particular aluminum or aluminum alloy.

With the selected aluminum alloys having the specified high Mg content, a sufficiently strong material is provided even after the temperature treatment during glazing which, even after cooling, i.e. after the glazing process does not soften too much and provides sufficiently high compression for a compression seal, so that a durable hermetically sealed feedthrough is obtained. "Hermetically sealed" in the current invention is understood as having a helium leakage rate of less than $1 \cdot 10^{-8}$ mbar-l/sec at a pressure difference of 1 bar.

In compression sealing, the material of the base body applies a compressive stress onto the glass- or glass ceramic material. To ensure this, the thermal coefficient of expansion of the light metal, in particular of the aluminum alloy of the base body is selected to be higher than that of the glass and/or glass ceramic material into which the functional element, in particular the conductor is sealed.

Compression sealing offers the advantage that a high mechanical strength, in particular a mechanically robust hermetically sealed glazing is provided. "Hermetically sealed" in the sense of the current invention means that the helium leakage rate is less than $1 \cdot 10^{-8}$ mbar-l/sec at a pressure difference of 1 bar. With the invention a hermetically sealed glazing can be provided with which the above helium leakage rate is achieved. To achieve a compression seal, the thermal coefficient of expansion of the glass or glass ceramic material differs from that of the base body. The thermal coefficient of expansion for the material of the base body is for example in the range of $18 \cdot 10^{-6}$/K to $30 \cdot 10^{-6}$/K and for the glass and/or glass ceramic materials between $15 \cdot 10^{-6}$/K to $25 \cdot 10^{-6}$/K, wherein the thermal coefficient of expansion of the material of the base body is selected to be greater than that of the glass and/or glass ceramic material.

In addition to the compression seal, the chemical compatibility of the material of the base body on the one hand and that of the glass and/or glass ceramic material on the other hand is important for the provision of a permanently strong and resilient feedthrough. With some feedthroughs it is suspected that chemical binding forces between the metal of the base body and the glass and/or glass ceramic material of the feedthrough in the interface region contribute to the stability of the glazing and thus to that of the entire feedthrough. In principle, components of the metal of the base body can diffuse into the glass and/or glass ceramic material of the feedthrough, at least in an interface region. These diffused components can reduce the chemical binding forces or even destabilize the glass structure, so that fractures can occur in the feedthrough.

The aluminum alloys that are used for the base body may contain Mn and/or Mg and/or Si and/or Zr as an additive.

In some embodiments, the alloy, in particular the aluminum alloy contains a total in additives of 2 to 10 weight-%, such as 3 to 8 weight-% or 4 to 6 weight-%. An exemplary aluminum alloy is Al 5083 which contains 4.5 weight-% Mg and 0.7 weight-% Mn. The additives in the aluminum, in particular Mg and Mn are responsible that even under the influence of high temperatures over a longer period of time the alloys do not soften, but that instead the aluminum alloy retains sufficient strength. This ensures that sufficient compression can be applied upon the glass material—even after heating—during sealing, thus ensuring the hermetic seal of the feedthrough. It has been recognized that these materials are moreover compatible in the above sense with the conventionally used glass and/or glass ceramic materials.

If the previously described base body which accommodates the functional element is to be joined with a surrounding housing, in particular through welding, a problem arises if the base body with the glazing of aluminum or aluminum alloy is to be sealed into a housing consisting of aluminum or an aluminum alloy and the aluminum alloys contain different additives such as Mg etc.

Welding of different aluminum alloys often results in cracks. Freedom of cracks and thus a high grade hermetic seal are difficult to achieve. It has been found that the probability of crack formation strongly increases when the Mg content or the Si content in the alloy is reduced and amounts to less than 1.5 weight-%. The crack formation is attributed to a solidification process at different solidification temperatures of the different components during welding. In order to avoid this, filler materials such as Si, Mn, Mg or Zr can be added at least in the area of the housing and/or the base body which is to be welded. Thus, a crack formation in the welding zone can be minimized. Effective weldability may be provided by aluminum alloys having a high Mg content of more than 3 weight-%. It has been determined that an aluminum alloy which meets the demands of high strength as well as good weldability is the aluminum alloy Al 5083 with 4.5 weight-% Mg and 0.7 weight-% Mn—however without restriction thereto. The filler materials can also be referred to as welding aid. For a base body that consists at least partially of a light metal with additives or welding aids, such as in the form of alloy components, in particular of an aluminum alloy which contains Mg and/or Si and/or Zr and/or Mn it was found according to some embodiments of the invention that for these materials good weldability with a light metal, such as aluminum, in particular also highest grade aluminum is achieved, when the Mg content of the aluminum alloy is in the range of 2 to 10 weight-%, such as 3 to 8 weight-% or 4 to 6 weight-%.

If a first body consisting of a light metal, for example aluminum is joined with a second body consisting of a light metal with additives of welding aids, then first material as well as second material met in the region of the joint, so that a mixture of first material and second material is created. The amount of welding aids in the region of the joint compared to the amount in the second body may then be lower. The material composition in the region of the bond differs thus from that of the individual connecting partners. When connecting two light metal bodies, wherein the first body is a light metal and the second body is a light metal with welding aids, in particular in the form of alloy components—if a welded connection is established between first and second body—melted material of the first body and melted material of the second body resulting in a mixture may be present in the welded connection and the content of the welding aids in the mixture may be lower than the content of the welding aids in the second component.

In some embodiments, the base body comprises at least one flange with a thickness and the amount of additives or welding aids, in particular the Mg content in the flange, is in particular adaptable to the thickness of the flange. Conversely it would also be possible to adapt the thickness of the flange to the proportion of additives or welding aids.

Surprisingly, use of a light metal with welding aid substance or additives, for example an aluminum alloy with Mn and/or Mg and/or Si and/or Zr ensures that two different components—for example aluminum and another component consisting of an aluminum alloy comprising Mn and/or Mg and/or Si and/or Zr can be welded together crack-free. Crack-free welding produces a hermetically sealed connection having a helium leakage rate of less than $1 \cdot 10^{-8}$ mbar-l/sec at a pressure difference of 1 bar.

It was moreover found that surprisingly a microcrack-free connection of aluminum with an aluminum alloy is achieved when the Mn share and or Mg share and/or the Si share and/or the Zr share is greater than 1.5 weight-%, such as greater than 2 weight-%. If the Mn share and/or the Mg share and/or the Si share and/or the Zr share is below 1.5 weight-%, the microcrack formation increases significantly. The microcrack formation is attributed to a solidification process at different solidification temperatures of the different components during welding. In some embodiments, the share of Mg and/or Mn and/or Si and/or Zr in the region of welding is adjusted such that no microcracks occur. The limit for the additives or the welding aid substance is at 10 weight-%, such as 8 weight-% or 6 weight-%. When joining two components, for example a base body and a housing, each consisting of light metal, additives or welding aid substances may be present in the base body or also in the housing into which the base body is inserted.

The above described good weldability is important in particular when one component, in particular the housing component which may consist of a light metal, in particular aluminum, such as highest grade aluminum accommodates a base body in an opening, wherein the base body, together with the glazing advantageously seals the opening. It is useful for a connection of base body and component, in particular housing component, that the housing component has a cut-out or mating flange to support a part of the base body, in particular a protrusion of a flange. The mating flange may have a thickness that is reduced relative to the thickness of the housing component. The mating flange of the housing component may be designed in the form of a stepped bore. This shape can also be produced by embossing/stamping the housing component and/or by other suitable processes. Also possible are combination of appropriate processes. In some embodiments, the mating flange has a first interface progressing substantially perpendicular relative to the conductor and the part of the base body, in particular the protrusion or flange has a second interface progressing substantially perpendicular relative to the conductor. First and second interface are positioned directly opposite one another and/or connect directly to one another, wherein the mating flange of the housing component engages in an L-shaped manner into the protrusion or flange of the base body. First and second interface are connected, such as firmly connected, in particular hermetically sealed. The connection occurs for example through welding, such as laser welding. The result is a welded connection joint between housing component and base body. Depending on the design of the interface of base body and housing component, welding, in particular laser welding is overlap and/or butt welding. By using an aluminum alloy with an Mg and/or Mn and/or Si and/or Zr content of 2 to 10 weight-% a microcrack-free welded connection between base body and housing component is provided. Based on the design of the component, in particular the housing component with a mating flange or cut-out for supporting a part of the base body, for example a flange or protrusion of the base body it is possible to fit the base body in a rational and reliable manner into the housing component; a press fit as in WO 2012/110242 A4 is not necessary. Moreover, it is possible with the specified arrangement of a mating flange or cut-out that accommodate a protrusion or respectively flange of the base body, that the surfaces are connected with one another without gap. The areas of the base body and the housing component overlap and welding occurs through the material of the housing component and/or through material of the base body. In contrast to the butt joint as known from WO 2012/110242 A4, the base body and the housing component can be connected with one another through low laser energy, wherein also narrower laser seams can be realized and/or wherein the track of the laser seam does not require particularly precise positioning. The amount of laser energy is thereby influenced substantially by material and the thickness of the material through which welding occurs.

If the housing component for accommodation of the base body, and the base body with the housing component are connected in a welding region by butt welding, the welding region comprises in one position ($P_1$, $P_2$) a first part of the base body and a second part of the housing component. It is useful if position ($P_1$, $P_2$) of the welding region is selected depending on the Mg and/or Si and/or Zr content in the aluminum alloy of the base body and/or the housing component. The welding regions are also moreover characterized by a depth ($T_1$, $T_2$), wherein depth ($T_1$, $T_2$) of the welding regions is selected depending on the Mg and/or Si and/or Zr content in the aluminum alloy. If the base body has a flange or protrusion and the housing component has a cut-out or a mating flange, the base body can be connected with the housing component in a first welding region by overlap welding and in a second welding region by butt welding. In such a case, the second welding region assumes a position ($P_1$, $P_2$) during butt joint welding, depending on the Mg content in the aluminum alloy of the base body and/or the housing component.

The cut-out or mating flange of the housing component may have a first interface progressing substantially perpendicular relative to the conductor and the part of the base body, in particular the flange or protrusion has a second interface progressing substantially perpendicular relative to the conductor and if first and second interface are positioned directly opposite one another. This can be achieved in particular by a stepped bore in the housing component. The term "stepped bore" herein does not mean that in manufacturing actual metal removing machine drilling occurs. Instead, non-cutting methods—for example stamping and/or reshaping—may produce the desired structure.

The depth of the stepped bore and the material thickness of the protrusion or flange of the base body can be selected such that the surfaces of the base body and the housing component are aligned with each other. The thickness of the flange or the protrusion and the thickness of the cut-out or mating flange of the housing component with which the base body is to be connected via the flange, determine among other factors the necessary energy and thus the heat input into the base body. The thickness ratio of the thickness of the flange relative to the thickness of the mating flange determine the welding parameters, in addition to the described selection of the materials. In some embodiments, the thickness of the flange at the base body is between 50% and 100%, such as 70% to 80% of the mating flange. In some embodiments, the thickness of the flange is 100% of the thickness of the mating flange, meaning the flange at the base body and the mating flange or the cut-out in the housing have the same thickness.

The materials for the housing and the base bodies can be different. It is in particular possible to adapt the thickness of the flange or that of the mating flange to the additives or welding aids in the materials, for example to the material in the base body. Conversely, the thickness of the flange or the mating flange can also be adapted to the additives or the welding aids in the materials.

In order to divert the heat occurring during the welding process and to relieve the housing component thermally and mechanically, the base body according to some exemplary embodiments of the invention has at least two grooves or depressions, in particular two circumferential grooves or depressions with a distance A from each other. Due to the grooves a thermal flow through the base body is reduced and/or mechanical load of the base body in direction perpendicular relative to the axis of the conductor is avoided, since the base body is deformable, such as reversibly deformable in the direction perpendicular relative to the axis of the conductor. Instead of the grooves, a multitude of recesses can also be provided, such as located adjacent to one another.

Based on the design of the base body with at least two grooves at a distance A from one another, the thermal flow, for example from the outside of the base body to the inside is reduced or even almost completely interrupted. Because of this a heat input—for example due to laser welding—on the outside to the inside of the base body where the glazing occurs, is largely avoided. This in turn results in that no stresses, in particular no tensile stresses which act upon the glazing and thus reduce the compression on the glass material, are introduced into the glass and/or glass ceramic material. Since the compression is not reduced by tensile stresses, the impermeability of the glazing is ensured. The two grooves moreover allow deformation of the base body. Mechanical loads which are transferred to the glass or glass ceramic material can thus be efficiently absorbed.

In some embodiments, the at least two grooves or depressions are designed in such a way that mechanical loads of the base body in direction perpendicular relative to the axis of the pin are avoided and the axis of the pin does not tilt.

In order to be able to connect the base body in a simple manner, for example with a housing, the base body is designed in a stepped manner with a thickness $D_3$ in the region of a protrusion or flange of the base body, whereby at least one first groove or depression is located in the region of the flange. In some embodiments, the base body has two circumferential grooves or depressions located at a distance A from one another, through which a thermal flow through the base body is being reduced. Said distance A may be between 0.1 mm and 1 mm, such as between 0.1 mm and 0.5 mm. Based on the selection of distance A, the magnitude of the thermal flow through the base body from the outside to the inside can be adjusted, and also the mechanical relief function of the grooves. Thus, it is possible to adjust the heat input. Another additionally provided possibility to adjust the heat input—either in combination and/or as an alternative—is the selection of the depth $T_1$, $T_2$ of the circumferential grooves or depressions.

Alternatively to the grooves, a multitude of recesses can also be provided, located adjacent to one another.

It is useful if the first and second groove or first and second series of recesses which are located adjacent to one another have a depth $T_1$, $T_2$ which is greater than half the thickness $D_3$ of the base body in the region of the flange or protrusion.

If the grooves or the series of recesses which are located adjacent to one another are placed on the opposite sides, that is on the surfaces of the flange, the depth $T_1$, $T_2$ of the first and second groove or depression on the opposite surfaces of the base body may be selected so that the maximum depths of the grooves and/or recesses overlap in the cross section of the base body.

This means in particular, that at least one groove and/or series of recesses is deeper than half the thickness of the flange. Herein, at least one groove and/or series of recesses is located in the region of the flange. In some embodiments, at least two grooves and/or series of recesses are deeper than half the thickness of the flange. If the base body is viewed in its cross section it is shown in this arrangement that a spring-like structure is being formed which effectively absorbs the forces which, during welding act upon the glass and/or glass ceramic material and which are caused by the thermal expansion.

As previously described, the base body includes at least two grooves or depressions, in particular circumferential grooves. The circumferential groove may be continuous around the circumference. The groove provides a relief of the base body in that the material in the base body is weakened in a targeted manner. In order that the base body can behave in a deformable and spring-like manner orthogonally relative to the direction of the feedthrough, the base body includes two circumferential grooves, wherein the first groove is introduced into a first base body surface and the second groove into a second base body surface and wherein the first and second base body surfaces are located opposite one another. This has the advantage in particular that during thermal expansion of the material of the base body—as can occur during manufacture of the housing during laser welding, but also during operation of the completed component—the base body can deform in a spring-like, in particular accordion-like manner, advantageously reversibly. The mechanical load on the insulation material, in particular the glass or glass ceramic material can be absorbed especially efficiently by said spring-like, in particular harmonica-like deformation. With this form of deformation, tilting of the axis of the conductor is also largely avoided.

Instead of grooves, the load relieving device can also be provided in the embodiment of a series of recesses, located adjacent to one another. These recesses represent craters in the material of the base body in which the material of the base body is weakened. The recesses can in particular be crater-shaped, cylindrical, pyramidal or in the shape of any desired transitional shape and/or in combination of aforementioned shapes. All embodiments and/or effects described for the grooves also apply to the series of recesses.

The first groove and the second groove may be located at a distance from one another, particularly distance A. Distance A may be in the range of 0.1 mm to 1.0 mm, such as 0.1 mm to 0.5 mm.

If two grooves—which can generally also be referred to as depressions—are provided in the base body, then the second grove is arranged in the base body in such a way that it is spaced apart from the welding region. It may be located in the area of the base body into which the conductor is glazed, whereas the first groove is located closer to the welding region. A hermetically sealed feedthrough in a housing is provided in particular if all aspects of the invention are considered. This means that: first the material for the base body is selected in such a way that sufficient strength is provided which, in regard to the material selection manifests itself with a yield point within a certain range; then the base body is connected by welding with the housing having certain material combinations, wherein crack formation and due to circumferential grooves undesirable heat input during welding are avoided.

Additional advantages of an effective hermetically sealed feedthrough result if the thickness of the housing component is clearly thinner than the glazing length in the base body. In such a case, a very light and thin housing, for example one of aluminum, in particular highest grade aluminum can be realized. Nevertheless, a sufficient glazing length is provided for the conductor material. In some embodiments, the housing component has a thickness $D_1$ and the base body a thickness $D_2$, wherein the thickness of the base body $D_2$ corresponds substantially with the glazing length and thickness $D_1$ is in the range of 20% to 80% of thickness $D_2$. Thickness $D_1$ and $D_2$ is always measured in the region outside of the flange or the mating flange.

In some embodiments of the feedthrough through the housing component by an additional base body into which the conductor, in particular the pin-shaped conductor is sealed it is possible to prefabricate the feedthrough. This means in particular that the pin material is sealed into the base body and subsequently installed into the housing component, in particular into a battery cell. The base body can then be designed in an optimized manner with regard to the respective fabrication technology and shape of the feedthrough as well as the fabrication technology and shape of the housing component. Due to the prefabrication substantially smaller heating devices can be used than in the case where sealing occurs directly into the housing component, because the whole housing component does not need to be heated, for example in an oven, but instead only the base body with substantially smaller dimensions. Moreover, with this type of embodiment where a prefabrication of the feedthrough, consisting of a base body and a conductor, in particular a pin-shaped conductor is possible, facilitates cost effective insertion of the feedthrough into the opening of the housing component, for example in a single step process, for example by utilizing strain hardening possibilities. Specifically this means, that first the opening is introduced into the housing component, for example into the cover, for example by stamping. The housing is strain hardened, since it is not being heated. In contrast thereto, the base body is soft, since during the glazing of the pin-shaped conductor with a glass or glass ceramic material it is heated. In this manner it is possible to produce a structurally strong battery cell housing, in particular in the region of the feedthroughs since, in contrast for example to direct glazing into a housing component no loss of strain hardening of the housing component, in particular the cover part, occurs. An additional advantage is that the material thickness of the housing component in contrast to the base body into which the glazing occurs can be selected to be clearly less. The material thickness of the housing component can for example be 1.5 mm and less, whereas the base body due to strength reasons has a thickness of 2.0 mm, such as 3.0 mm or more. Material thickness $D_1$ of the housing or the housing component may be between 1 mm and 3 mm, such as between 1.5 mm and 3 mm, the thickness of base body $D_2$ between 2 mm and 6 mm, such as 2.5 mm and 5 mm. The thickness of the base body $D_2$ is thereby always selected, adapted to the material thickness of the housing or respectively the housing component, in particular the battery or capacitor cover into which the feedthrough is inserted. With direct glazing however unnecessarily large material thicknesses would be required in contrast. The thickness $D_2$ then corresponds with glazing length EL.

An additional advantage of the design of the feedthrough with a base body is, that the materials for the base body and the housing component can be selected to be different, in particular in regard to the material quality and the selection of the alloy. Thus, by using a material combination of aluminum for the housing component, in particular highest grade aluminum into which the base body consisting of an aluminum alloy with a content of Mg and/or Si and/or Zr of for example 2 to 10 weight-% is inserted, largely crack-free welding is achieved. The feedthrough can be joined with the base body in the housing component hermetically sealed by welding, soldering, press fitting, crimping or shrinking. When joining the feedthrough with the housing component, for example by welding, attention is given to keeping the temperature input as low as possible in order to prevent damage to the glass or glass ceramic material. As previously described, it is hereby advantageous if the material of the base body is an aluminum alloy with a content of Mn and/or Mg and/or Si and/or Zr of 2 to 10 weight-%. Thus, cracks are prevented, and hermetic seals are achieved. In this application, hermetically sealed means that the helium leakage rate of less than $1 \cdot 10^{-8}$ mbar-l/sec. In contrast to the current state of the art wherein a plastic seal had to be provided for the feedthrough in a multi-step process, a hermetically sealed connection of the inventive feedthrough component with the housing component can be produced in one single simple process step.

The selection of the base body can moreover also occur with a view to the material of the housing, concerning the edge design as well as the material hardness and in particular also the method for closing the housing. If the battery cell housing consists for example of aluminum, in particular highest grade aluminum, for prevention of crack formation, an aluminum alloy with Mn and/or Mg and/or Si and/or Zr may be selected as the material for the base body.

It is moreover possible to introduce also other functions in addition to the feedthrough in the housing component of the housing of the battery cell, for example a safety valve and/or a battery fill opening.

In addition to the described aluminum alloy with Mg and/or Si and/or Zr the housing component and/or the base body, such as the substantially annular base body can comprise as the material also a metal, in particular a light metal, such as titanium, a titanium alloy, magnesium, a magnesium alloy, AlSiC, but also steel, stainless steel or high grade steel. Titanium alloys which can be used are for example Ti6246 and/or Ti6242. Titanium is a bio-compatible material, so that it is used in medical applications, for example in prosthetics. Equally, because of its strength, durability and low weight, its use is favored in special applications, for example in chemical analysis or synthesis, in energy generation plants, in racing and also for aerospace applications.

For the pin-shaped conductor copper (Cu) or a copper alloy are notably used if the pin-shaped conductor is to be connected to a cathode of the electrochemical cell or battery cell; aluminum (Al) or an aluminum alloy are used if the conductor, in particular the pin-shaped conductor is be connected to an anode. Other materials for the conductor can be magnesium, a magnesium alloy, a copper alloy, CuSiC, AlSiC, NiFe, a copper core—i.e. a NiFe casing with a copper interior, a silver alloy, gold, a gold alloy as well as a cobalt-iron alloy.

Aluminum or aluminum alloys which can also be considered are aluminum alloys with an Mn-content and/or Mg and/or Si and/or Zr content in the range of 2 to 10 weight-%, such as 3 to 8 weight-%, or 4 to 6 weight-%. The aluminum alloy with Mg and/or Si and/or Zr is used especially for the base body. For the housing aluminum without these elements may be used. The disadvantage in the use of the aluminum without these elements is, that the material becomes soft during heating, which is why it is not suitable for the base body into which the metal pin is glazed. Because of softening during heating during the glazing process, the metal surrounding the glass material, in particular the aluminum may no longer apply the necessary compression onto the glass material in order to provide a hermetically sealed feedthrough. During the glazing process, heating to temperatures which may in the range of 520° C. to a maximum of 560° C. for an extended period of time, such as longer than 1 to 60 minutes occurs.

Possible aluminum alloys that have a yield point in the range of between $40^N/mm^2$ and $150^N/mm^2$, as well as having a sufficiently high content of welding aid so that crack formation can be prevented are specified in the following tables 1A and 1B:

TABLE 1A

Aluminum alloys for glazing and weldability

| Additives | Alloy | 1070A | 3003 |
|---|---|---|---|
| | Mg | ≤0.03 | / |
| | Mn | ≤0.03 | 1.0-1.5 |
| | Fe | ≤0.25 | ≤0.7 |
| | Si | ≤0.2 | ≤0.6 |
| | Cu | ≤0.03 | 0.05-0.2 |
| | Zn | ≤0.07 | ≤0.1 |
| | Cr | / | / |
| | Ni | / | / |
| | Ti | 0.03 | / |
| Young's Modulus | | | |
| Strain hardened | Yield point N/mm$^2$ | 105 | 185 |
| | Young's Modulus | 70 | 69.5 |
| Annealed | Yield point N/mm$^2$ | 15 | 50 |
| | Young Module | 70 | 69.5 |
| CTE. RT-300° C. | | 23.5 | 25.2 |
| Melting temperature | | 659 | 655 |

TABLE 1B

Aluminum alloy for glazing

| Additives Alloy | 3004 | 4032 | 5049 | 5452 | 5454 | 5754 | 5083 |
|---|---|---|---|---|---|---|---|
| Mg | 0.8-1.3 | 0.8-1.3 | 1.6-2.5 | 2.2-2.8 | 2.4-3.0 | 2.6-3.6 | 4.0-4.9 |
| Mn | 1.0-1.5 | / | 0.5-1.1 | ≤0.1 | 0.5-1.0 | 0.5 | 0.4-1.0 |
| Fe | ≤0.7 | ≤1 | ≤0.5 | ≤0.4 | 0.4 | 0.4 | ≤0.4 |
| Si | ≤0.3 | 11-13.5 | ≤0.4 | ≤0.25 | 0.25 | 0.4 | ≤0.4 |
| Cu | ≤0.25 | 0.5-1.3 | ≤0.1 | ≤0.1 | 0.1 | 0.1 | ≤0.1 |
| Zn | ≤0.25 | ≤0.25 | ≤0.2 | ≤0.1 | 0.25 | 0.2 | ≤0.25 |
| Cr | / | ≤0.1 | | 0.1-0.35 | 0.05-0.2 | 0.3 | 0.05-0.25 |
| Ni | | 0.5-1.3 | | | | | |
| Ti | / | / | ≤0.1 | | 0.2 | 0.15 | ≤0.15 |
| Yield point | 230 | 240-340 | 250 | 240 | 250(38) | 230 | 300(H16) |
| Young's Modulus Strain hardened | 70 | 70-80 | 70 | 70 | 70 | 70 | 71 |
| Yield point | 60 | — | 80 | 65 | 85 | 80 | 125 |
| Young's Modulus Annealed | 70 | — | 70 | 70 | 70 | 70 | 71 |
| CTE RT-300° C. | 25.1 | 21 | 23.7 | 25.7 | 23.6 | 23.9 | 23.8 |
| Melting temperature | 629-654 | 530-570 | 620-650 | 607-649 | 602-646 | 610-640 | 640 |

All values for the yield points specified in Tables 1A and 1B were determined by tensile tests.

An exemplary material for the base body into which the glazing can be implemented and which ensures weldability without crack formation was surprisingly found to be the aluminum alloy 5083. It is characterized not only by its good weldability without crack formation, but also in that the alloy after heating to 540° C. during glazing still offers sufficient strength for a compression glazing.

In regard to copper the following can be used, especially for the conductor:
Cu-PHC 2.0070
Cu-OF 2.0070
Cu-ETP 2.0065
CU-HCP 2.0070
Cu-DHP 2.0090

In the current application, light metals are understood to be metals that have a specific weight of less than 5.0 kg/dm$^3$. The specific weight of the light metals is in particular in the range of 1.0 kg/dm$^3$ to 3.0 kg/dm$^3$.

If the light metals are also used as the materials for the conductor, for example the pin-shaped conductor or for the electrode connecting component, then the light metals are further characterized by a specific electric conductivity in the range of 5·10$^6$ S/m to 50·10$^6$ S/m. When inserted in compressive glass feedthroughs the thermal coefficient of expansion a for the range of 20° C. to 300° C. is moreover in the range of 18·10$^{-6}$/K to 30·10$^{-6}$/K.

In general, light metals have melting temperatures in the range of 350° C. to 800° C.

The base body may be designed as an annular base body, such as in a circular shape, but also in an oval shape. The oval shape may be used, for example, if the housing component, in particular the cover part of the battery cell into whose opening(s) the feedthrough is inserted has a narrow longitudinal shape and the glass or respectively the glass ceramic material with which the pin-shaped conductor is feed through the housing component in the opening is inserted completely between the base body and the pin-shaped conductor. With this design, the feedthrough consisting of a substantially pin-shaped conductor and a substantially annular base body can be prefabricated.

In some embodiments, glass or glass ceramic materials are selected which have a sealing temperature that is lower than the melting temperature of the base body and/or that of the substantially pin-shaped conductor. The glass or glass ceramic material compositions may have low sealing temperatures. A composition with such characteristics comprises for example the following components:

| | |
|---|---|
| $P_2O_5$ | 35-50 mol-%, such as 39-48 mol-% |
| $Al_2O_3$ | 0-14 mol-%, such as 2-12 mol-% |
| $B_2O_3$ | 2-10 mol-%, such as 4-8 mol-% |
| $Na_2O$ | 0-30 mol-%, such as 0-20 mol-% |
| $M_2O$ | 0-20 mol-%, such as 12-20 mol-%, wherein M = K, can be Cs, Rb |
| PbO | 0-10 mol-%., such as 0-9 mol-% |
| $Li_2O$ | 0-45 mol-%, such as 0-40 mol-%, or 17-40 mol-% |
| BaO | 0-20 mol-%, such as 5-20 mol-% |
| $Bi_2O_3$ | 0-10 mol-%, such as 1-5 mol-% or 2-5 mol-%. |

The composition may comprise the following components:

| | |
|---|---|
| $P_2O_5$ | 38-50 mol.-%, such as 39-48 mol.-% |
| $Al_2O_3$ | 3-14 mol.-%, such as 2-12 mol.-% |

-continued

| | |
|---|---|
| B₂O₃ | 4-10 mol.-%, such as 4-8 mol.-% |
| Na₂O | 10-30 mol.-%, such as 0-20 mol.-% |
| K₂O | 10-20 mol.-%, such as 12-19 mol.-% |
| PbO | 0-10 mol.-%., such as 0-9 mol.-% |

The previously specified glass compositions are characterized not only by a low sealing temperature and a low Tg, but also in that they have a sufficiently high resistance in relation to battery electrodes and thus ensure the required long-term resistance. This type of glass composition may be introduced at least into the core region of the feedthrough.

The previously specified glass materials are stable phosphate glasses which have a clearly lower total alkali content than conventional alkali-phosphate glasses.

Because of the generally high crystallization-stability of the phosphate glasses it is ensured that the fusing of the glasses is generally not hampered even at temperatures of <600° C. This allows for most of the listed glass compositions to be used as solder glass since fusing of the glass compositions is generally not hampered even at temperatures of <600° C.

The previously specified glass compositions may have Li built into the glass structure. Because of this, the glass compositions are especially suitable for Li-ion storage devices that comprise electrolytes based on Li, for example of a 1 M $LiPF_6$ solution comprising a 1:1 mixture of ethylene carbonate and dimethyl carbonate.

Low sodium or respectively sodium free glass compositions may be used, since the diffusion of the alkali-ions occurs in the sequence of Na+>K+>Cs+. Low sodium or respectively sodium free glasses are therefore especially resistant to electrolytes, in particular those as are used in Li-ion storage devices.

Such glass compositions moreover have a thermal expansion a in the range of 20° C. to 300° C. of $>14 \cdot 10^{-6}$/K, especially between $>15 \cdot 10^{-6}$/K and $>25 \cdot 10^{-6}$/K. An additional advantage of the previously specified glass composition can be seen in that sealing the glass with the surrounding light metal or respectively the metal of the conductor, in particular in the embodiment of a metal pin is also possible in a gaseous atmosphere that is not an inert gas atmosphere. In contrast to previous methods, a vacuum is also not necessary for Al-seals. Such sealing can also occur under atmosphere. For both types of fusion, $N_2$ or Ar can be used as the inert gas. In a pretreatment to sealing, the metal, in particular the light metal is cleaned and/or etched, and if necessary oxidized or coated in a targeted manner. During the process, temperatures between 300° C. and 600° C. are used at heating rates of 0.1 to 30 K/min, and with dwell times of 1 to 60 min.

The sealing temperature may for example be determined through the hemispherical temperature as described in R. Görke, K. J. Leers: Keram.Z.48 (1996) 300-305, or according to DIN 51730, ISO 540 or CEN/TS 15404 and 15370-1 whose disclosure content is included in its entirety herein. The measurement of the hemispherical temperature is described in detail in DE 10 2009 011 182 A1 whose disclosure content is included in its entirety herein. According to DE 10 2009 011 182A1 the hemispherical temperature can be determined in a microscopic process by using a heating stage microscope. It identifies the temperature at which an originally cylindrical test body melted into a hemispherical mass. A viscosity of approximately log η=4.6 dPas can be allocated to the hemispherical temperature, as can be learned from appropriate technical literature. If a crystallization-free glass, for example in the form of a glass powder is melted and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat provides the bonded connection with the components which are to be joined. Generally, the sealing temperature or melting temperature is consistent with the level of the so-called hemispherical temperature of the glass. Glasses having low sealing temperatures or respectively melting temperatures are also referred to as solder glass. Instead of sealing or melting temperature, one speaks of solder temperature or soldering temperature in this instance. The sealing temperature or respectively the solder temperature may deviate from the hemispherical temperature by +20K.

The housing component of the battery housing or respectively the battery cell housing may have an outside and an inside, and the base body of the feedthrough may be connected with the inside or the outside of the housing component, in particular for example by welding.

For this purpose, the base body may have a protrusion or flange that engages into the cut-out of the housing component. In the region of the cut-out or mating flange, the base body can then be connected with the housing component by welding.

The flange has a thickness that can be adapted to the Mg and/or Si and/or Zr content of the flange material in the welding zone.

Several options are available for the welding connection between the base body and the housing component. If the housing component does not have a protrusion, the base body and the housing component can be joined with one another by butt welding.

If there is a protrusion it is possible that the base body and housing component are joined by overlap welding. In the case of a protrusion it is also possible that overlap welding as well as butt welding are performed.

The positions of the laser weld regions may be adaptable to the alloys, in particular the aluminum alloys that are to be joined. This applies especially to the Mg and/or Si and/or Zr and/or Mn content in the welding zone. Also the welding depth in the base body is variably adaptable, for example to the Mg and/or Si and/or Zr and/or Mn content in the welding zone and/or the thickness of the protrusion. As previously described, the Mg and/or Si and/or Zr and/or Mn content determines decisively the crack formation during the welding or respectively sealing process. In addition to the housing component, exemplary embodiments also provides an electrical device, in particular a storage device, such as a battery cell. Alternatively, the electrical device can also be a capacitor, in particular a super capacitor. The housing includes at least one housing component having at least one opening and is characterized in that the opening of the housing component accommodates a feedthrough with at least one pin-shaped conductor which is sealed into a base body.

The battery cell for which the housing is provided, may be a battery cell for a lithium-ion battery.

A feedthrough in a light metal housing can be used in many fields. For example, light metal housings for batteries or capacitors or super capacitors are conceivable. Feedthroughs provided according to the invention can however also be used in the aerospace industry or medical technology. In the aerospace industry this applies predominantly to feedthroughs for lightweight construction applications. Applications in the medical industry are equally possible, for example in prosthetics and/or implants.

Exemplary embodiments disclosed herein moreover provide a method to produce a feedthrough with at least one essentially pin-shaped conductor, whereby the method comprises the following steps:
- a conductor, such as an essentially pin-shaped conductor and a base body are provided
- the conductor, such as the essentially pin-shaped conductor is sealed into a base body embedded in a glass or glass ceramic material
- the base body is connected with a part of the housing—such as with a cut-out in the housing component—by laser welding.

The base body—in the region of the protrusion, such as the region of the flange—may be pressed prior to laser welding by a holding device into the cut-out or the mating flange of the housing component, in order to prevent a gap between the base body and the housing component.

Laser welding may occur through the housing component into the base body.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1A is a sectional view of an exemplary embodiment of a base body provided according to the present invention;

FIG. 1B is a top view of the base body illustrated in FIG. 1A;

FIG. 1C is a perspective view of the base body illustrated in FIGS. 1A-1B;

FIG. 1D is a close-up view of a portion of the base body illustrated in FIG. 1A;

FIG. 7 illustrates another exemplary embodiment of a housing component provided according to the invention, with a metal pin and a base body inserted into a cut-out in the housing.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 2:
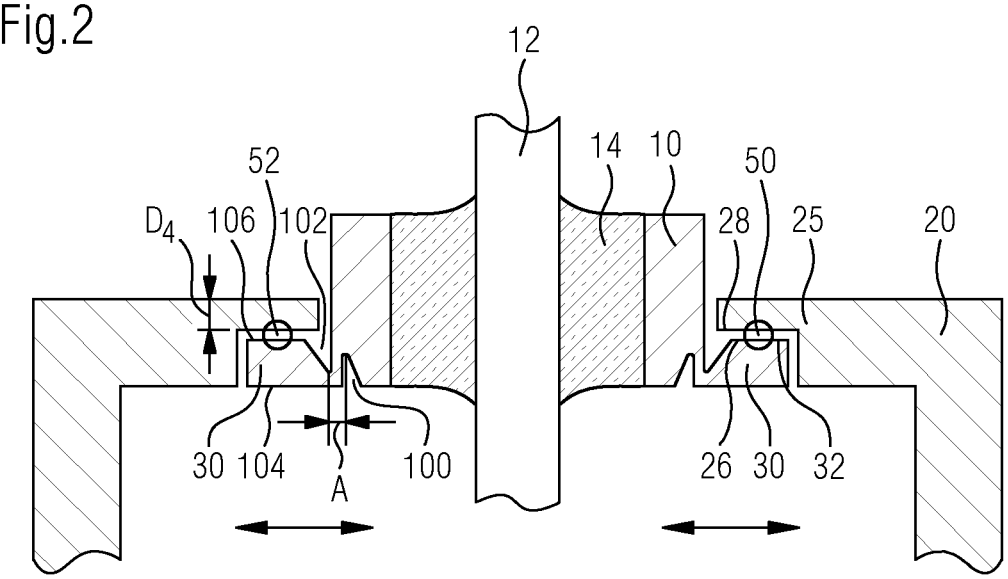
FIG. 2 illustrates an exemplary embodiment of a housing component provided according to the present invention with a metal pin and a base body inserted into a cut-out in the housing component.

FIGS. 1A-1D show an exemplary embodiment of a base body provided according to the invention which was produced in a stamping process for accommodation of a metal pin in a glass or glass ceramic material and which is of a ring shaped design. Base body 10 is shown in a cross section in FIG. 1A, in a top view in FIG. 1B and in a 3-dimensional view in FIG. 1C. The base body comprises an opening 13 through which the conductor is inserted in a glass or glass ceramic material. Opening 13 can be introduced into the base body by, for example, stamping. Base body 10 moreover includes flanges or respectively protrusions 30 which can come into contact with a cut-out or a mating flange of a housing component. As used herein, a flange is understood to be in particular a ring-shaped expansion of the base body with a lesser thickness. The flange is the part of the base body for connection with other components. Flange 30 is thus a connecting element. One of the tasks of the flange is the positioning of the parts that are to be connected with one another. The flange of the base body also serves to connect the base body by a mating flange with the housing. Clearly visible are the two circumferential grooves or the series of recesses 100, 102 which are placed into the base body, in order to provide the described flexibility and thermal separation.

FIG. 1D in particular, shows the two circumferential grooves 100, 102 in detail. The two grooves 100 102 are arranged on opposite base body surfaces 104, 106, such as in the region of the protrusion or flange 30 of base body 10. The grooves have different depths $T_1$, $T_2$. Depth $T_1$ is allocated to groove 100 and depth $T_2$ is allocated to groove 102. Depth $T_1$ in the current design example is greater than $T_2$, without being limited thereto. The plane of the lowest point $P_1$ of groove 100 is arranged at a distance A to the uppermost point $P_2$ of groove 102. Distance A which describes the distance between groove 100 and groove 102 is, for example, 0.1 to 1 mm, such as 0.1 to 0.5 mm. Depth $T_1$ of groove 100 may be arranged at 0.1 to 4 mm, such as 1 mm to 3 mm, and depth T2 of the groove may be 0.1 to 4 mm or 1 mm to 2 mm.

In the illustrated example, first groove 100 is arranged in the region of the protrusion of flange 30, second groove 102 in the base body itself. As previously noted, distance A between first groove 100 and second groove 102 may be 0.1 mm to 1.0 mm, such as 0.1 mm to 0.5 mm.

The base body has a thickness $D_2$ which is substantially consistent with glazing length EL. Protrusion or flange 30 of the base body has a thickness $D_3$ which is less than thickness $D_2$ of the base body. $D_3$ may be only 10% to 50%, such as 20% to 40% of thickness $D_2$. Thickness $D_2$ may be in the range of 3 mm to 7 mm, such as 4 mm to 6 mm. Thickness $D_2$ is 2.5 mm, or 1.0 mm to 2.0 mm. Diameter D of the base body is 30 to 40 mm, the length of flange 30 is between 0.5 mm and 5 mm.

A conductor, such as a pin-shaped conductor, is sealed in a glass or glass ceramic material into opening 13. This is only shown in FIGS. 2 and 7. Sealing of a conductor in a glass or glass ceramic material into opening 13, as shown in FIGS. 2 and 7, can be transferred easily by an expert to the other embodiments according to FIGS. 1A-6. In some embodiments, the thermal coefficient of expansions of base body and glass or glass ceramic material are different. The thermal coefficient of expansion of the base body is in the range of $18 \cdot 10^{-6}$/K to $30 \cdot 10^{-6}$/K, that of the glass or glass ceramic material between $15 \cdot 10^{-6}$/K to $25 \cdot 10^{-6}$/K. If the thermal coefficient of expansion of the material of the base body is greater than that of the glass or glass ceramic material, a compression seal is formed.

Figure 3:
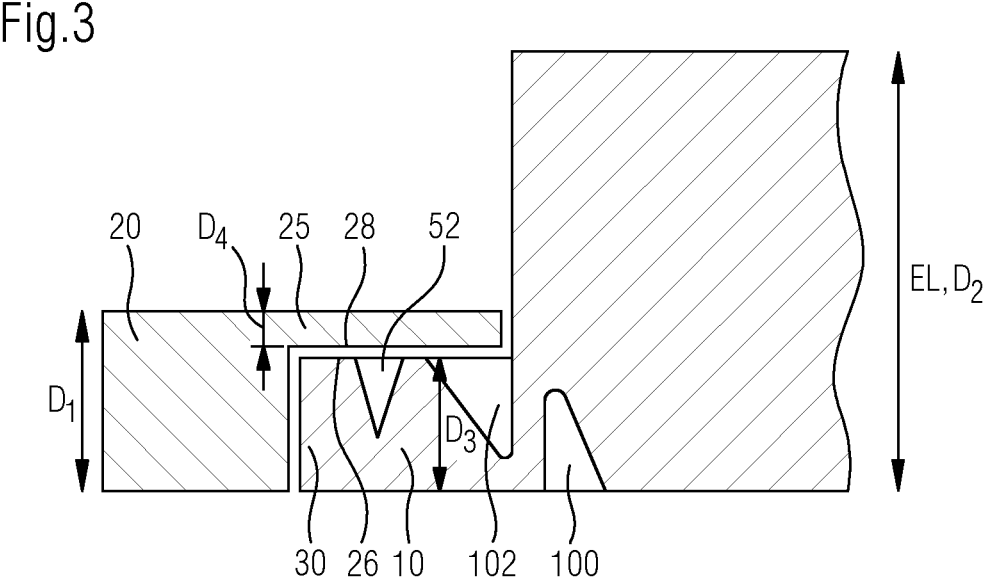
FIG. 3 is a detailed view of the connection of the base body and the housing component.

FIGS. 2 and 3 illustrate one exemplary embodiment provided according to the invention, wherein a base body 10 with a metal pin 12 that was sealed into the base body in a glass or glass ceramic material 14 is inserted into a housing component 20.

FIG. 2 shows the entire housing component with the base body. FIG. 3 shows the connection of base body and housing component in detail. A compression seal is obtained when the thermal coefficient of expansion of glass or glass ceramic material and the surrounding metal of the base body are different. A compression seal results especially when the thermal coefficient of expansion of the base body is greater than that of the glass or glass ceramic material in the feedthrough opening of the base body. A compression seal provides a thermally sealed fit with a helium leakage rate of less than $10^{-8}$ mbar 1/sec at a pressure difference of 1 bar. Base body 10 is inserted into a part of housing 20 and is firmly connected with the housing, for example through a welded joint, in particular a laser welding joint produced in a laser welding process. In order to avoid crack formation when welding together base body 10 and housing 20 it is advantageous when the base body and housing comprise different materials. The housing may consist of aluminum, in particular high or highest grade aluminum, and the base body of an aluminum alloy with Mg, Mn, Si, Zr, wherein the content of Mg, Mn, Si, Zr may be in a range of 2 to 10 weight-%. According to the invention, the housing component includes a mating flange 25 into which protrusion or flange 30 engages. Region 25 is also referred to as mating flange to flange 30 of the base body. Surface 32 of protrusion or flange 30 is then located opposite surface 28 of mating flange 25 of the housing component. The two opposing surfaces 26 and 28 of the flange of the base body, as well as those of the mating flange of the housing component are positioned with a small gap and the base body is connected with the housing component in the region of the opposite surfaces of flange and mating flange by a laser welding process with one or several welding points 50. This type of connecting is also referred to as overlap welding. According to the invention, laser welding occurs through the housing component in region 52 into base body 30. With overlap welding the depth of the weld can be variably adapted in regard to the material and in the case of an aluminum alloy, for example in regard to the Mg— and/or Si and/or Zr and/or Mn content of the material, as well as to the thickness of the protrusion. Based on the fact, that sides 26, 28 of protrusion or respectively flange 30 and of mating flange 25 are opposing sides, laser welding with a very narrow gap is possible. This requires a lower laser energy than for butt joint welding and a narrower laser seam is possible than with butt joint welding, as disclosed for example in WO 2012/110242 A4. On the other hand, the base body and housing can also be joined by butt joint welding, in particular in cases where the base body does not feature a protrusion or flange. However, if the base body has a flange, the thickness of the cut-out or mating flange in the housing is selected such, that thickness $D_4$ of the housing component in the region of the mating flange is clearly thinner than thickness $D_2$ of the entire housing component, and an optimum welding thickness for the laser welding process is provided. Whereas thickness $D_1$ of the housing component is kept to a minimum due to weight considerations and is approximately 1.5 mm, the base body in the region of the glazing must provide at least the glazing length EL. Glazing length EL is in the range of 3 mm to 7 mm.

Base body 10 into which conductor 12 is sealed in a glass or glass ceramic material may be produced as a stamped component from an aluminum ring. During the manufacturing process, base body 10 is first punched, followed by sealing, especially compression sealing of conductor 12. Then, the base body with protrusion or flange is pressed into the cut-out or mating flange of the housing component in order to prevent a gap of the parts that are to be joined by laser welding. After the protrusion is firmly pressed into the cut-out, laser welding occurs through thickness $D_4$ of the housing component or more specifically the mating flange.

The base body moreover includes two circumferential grooves 100 and 102 which are also referred to as recesses. The grooves or more specifically recesses are arranged at a distance from the side where the welding connection of the base body with the housing component occurs.

With the two grooves 100, 102 which may be designed as circumferential grooves, it can be realized that elasticity is provided in order to protect or more specifically relieve the feedthrough, in particular in the region of the glazing. The recess or more specifically the circumferential groove moreover constitute a thermal barrier which prevents that a heat input during glazing in the region of the points that are to be connected by welding is prevented.

In some embodiments, the arrangement includes two circumferential grooves, that is one circumferential groove 100 which is introduced into first base body surface 104, and a second circumferential groove 102 which is introduced into second base body surface 106, wherein first base body surface 104 and second base body surface 106 are located opposite one another in the region of the protrusion. Distance A between the two grooves 100 and 102 is 0.1 to 1.0 mm, in particular 0.1 to 0.5 mm.

The two grooves facilitate the base body being designed in a spring like manner, meaning deformably orthogonally relative to the direction of the feedthrough. Thus, stresses that are introduced during laser welding can be avoided, which otherwise would lead to cracks and breaks in the glazing. This is prevented in particular in that a heat input occurs through space A of the grooves.

An additional advantage in the design with the two circumferential grooves is, that also during operation during heating, the component can absorb stresses without passing them on to the glass feedthrough. As discussed, the region in which laser welding between the base body and the housing component occurs is located at a distance from the two circumferential grooves.

As the material for glazing, a glass or glass ceramic material containing the following components in mol-% is considered:

| | |
|---|---|
| $P_2O_5$ | 35-50 mol-%, such as 39-48 mol-% |
| $Al_2O_3$ | 0-14 mol-%, such as 2-12 mol-% |
| $B_2O_3$ | 2-10 mol-%, such as 4-8 mol-% |
| $Na_2O$ | 0-30 mol-%, such as 0-20 mol-% |
| $M_2O$ | 0-20 mol-%, such as 12-20 mol-%, whereby M = K or can be Cs or Rb |
| PbO | 0-10 mol-%, such as 0-9 mol-% |
| $Li_2O$ | 0-45 mol-%, such as 0-40 mol-%, or 17-40 mol-% |
| BaO | 0-20 mol-%, such as 0-20 mol-% or 5-20 mol-% |
| $Bi_2O_3$ | 0-10 mol-%, such as 1-5 mol-% or 2-5 mol-% |

These glass compositions distinguish themselves not only through a low sealing temperature and a low Tg, but also in that they have sufficient resistance to battery-electrolytes and in this respect ensure the required long-term durability.

The illustrations detailed in FIGS. 2 and 3 show the connection of part 10 with housing component 20 and how a base body into which the glazing occurs is constructed. FIG. 2 shows again, in detail the connection of base body 10 with housing component 20, wherein the arrangement shown in FIG. 2 features a protrusion. Components which are the same as in FIG. 2 have been assigned the same reference numbers. Base body 10 in which the glazing is performed in the region of the opening, has a thickness of $D_2$ which is consistent with the glazing length. Thickness $D_2$ of the base body is substantially greater than thickness $D_1$ of the housing component. Generally, thickness $D_1$ is in the range of 20% to 80% of thickness $D_2$. Clearly visible in FIG. 2 is section 25 or mating flange 25 in the housing component with surface 28, wherein surface 26 of protrusion or flange 30 of base body 10 fits closely against surface 28. Base body and housing component can be welded together by overlap welding in the region of surfaces 28 and 26. The base body comprises two circumferential grooves 100,102, wherein grooves 100, 102 are designed on opposite sides of the base body, in particular in the region of the flange. The grooves are moreover also positioned spaced apart from one another. Grooves 100, 102 provide deformability orthogonally relative to the direction of the feedthrough, and a certain elastic effect of the base body. Thickness $D_3$ designates the thickness of the flange of the base body, thickness $D_4$ the thickness of the mating flange of the housing.

Figure 4:
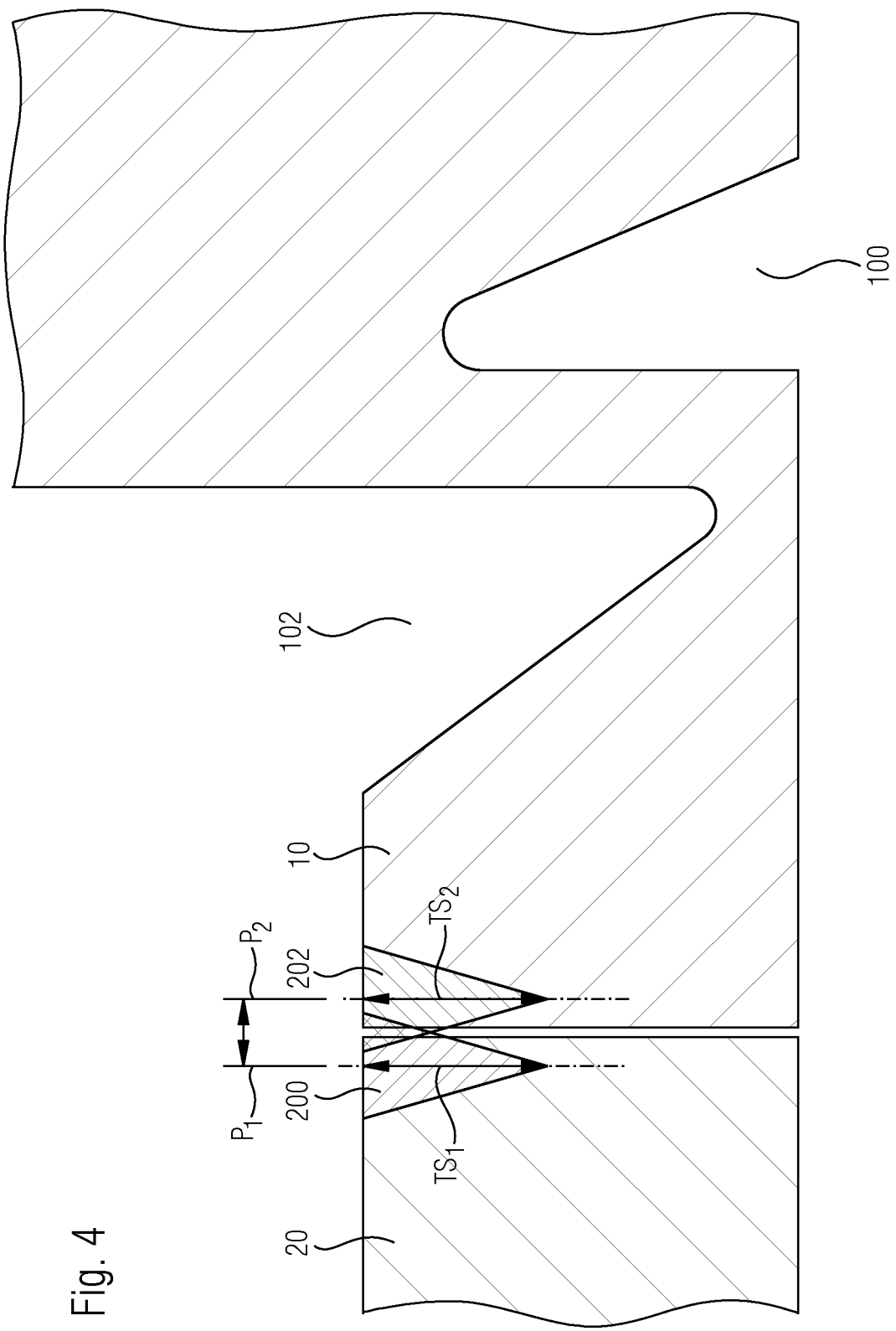
FIG. 4 is a detailed view of the connection of the base body and the housing component, the base body and the housing component being joined with one another by butt welding.
Figure 5:
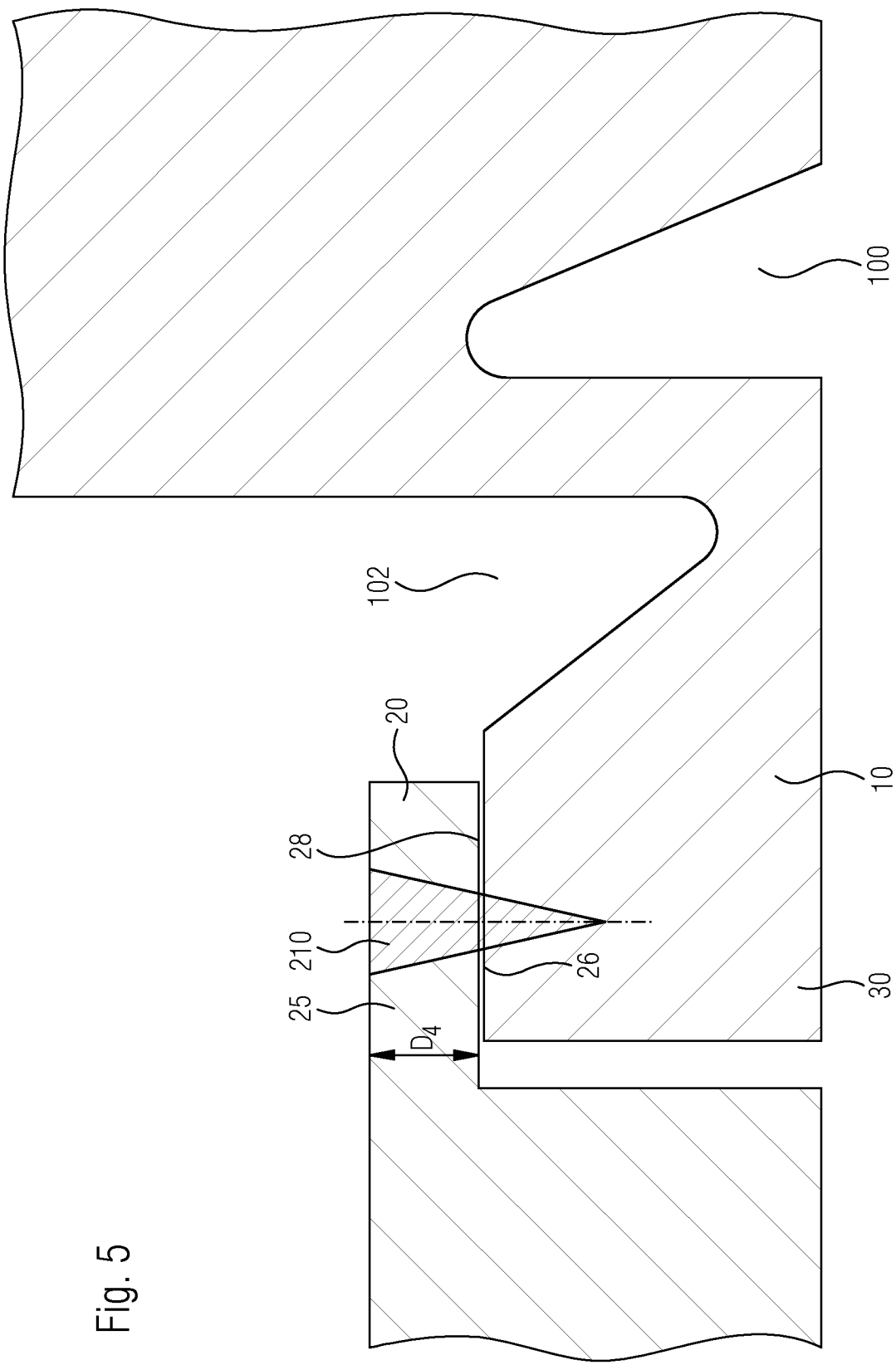
FIG. 5 is a detailed view of the connection of the base body and the housing component, the base body and the housing component being joined with one another by overlap welding.
Figure 6:
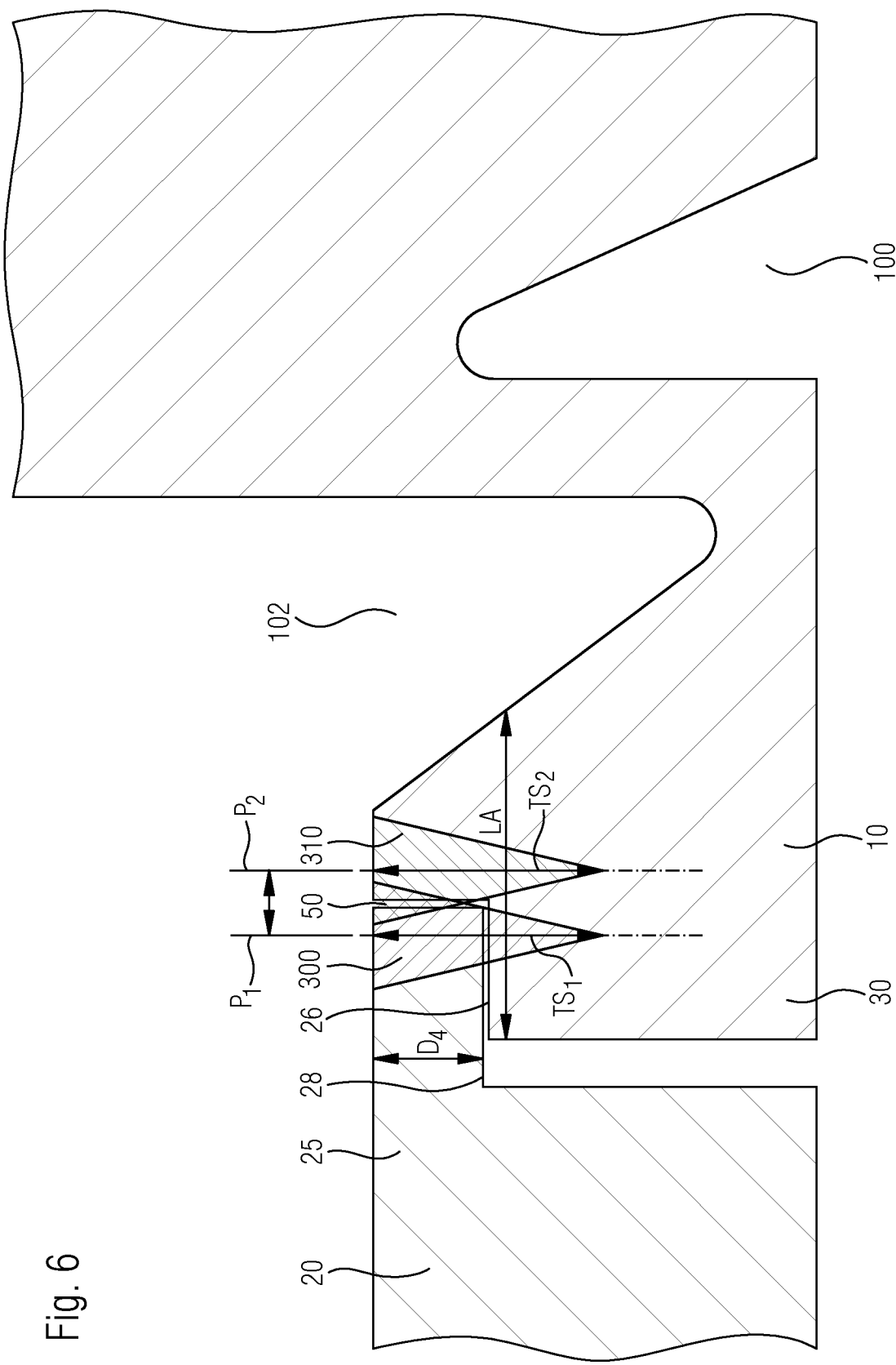
FIG. 6 is an additional detailed view illustrating the base body and the housing component joined with one another by butt welding as well as overlap welding.

FIGS. 4 to 6 illustrate s a number of methods of connecting the base body with the housing component.

FIG. 4 shows the connection of a base body 10 which is connected with a housing component 20 by butt welding. Components which are the same as in FIGS. 1 to 3 have been assigned the same reference numbers. According to the invention, base body 10 has two grooves 100 and 102 which are also shown in FIGS. 1 to 3. In contrast to the embodiments in FIGS. 1 to 3 the base body has no flange or protrusion, which is why base body 10 and housing component 20 can only be joined with one another by butt joint welding. Two possible welding regions are provided for butt joint welding which are identified with reference numbers 200 and 202. Welding region 202 is located on base body 10, welding region 200 in the region of the housing component, for example cover 20. Welding regions 200, 202 can—in their positions $P_1$, $P_2$—be adapted to the material compositions of base body 10 or housing component 20. It is especially possible to adapt positions $P_1$, $P_2$ to the Mg and/or Si and/or Zr and/or Mn content of the aluminum alloy in base body 10. In addition to position $P_1$, $P_2$ each welding region is also characterized by depths $TS_1$ and $TS_2$. Depths $TS_1$ and $TS_2$ can also be adapted to the different materials, in particular to the different aluminum alloys of base boy and housing component.

FIG. 5 illustrates another exemplary arrangement of a connection of base body 10 and housing component 20, wherein in the current application, base body 10 comprises a flange 30. The housing has a mating flange 25. Surfaces 28 of mating flange 25, and 26 of flange 30 are located opposite one another. Moreover, housing component 20 and base body 10 are joined by overlap welding. In overlap welding there is only one welding region 210. The thickness of mating flange 25 is indicated with $D_4$. Welding, in overlap welding occurs—as noted—through thickness $D_4$ of the mating flange. Thickness $D_4$ of the mating flange is adapted to the material, especially to the Mg content in the material of the mating flange. The materials of housing component 20 may be aluminum or an aluminum alloy. The two grooves 100, 102 are worked into the base body, as described in FIGS. 1 to 3.

FIG. 6 shows an exemplary arrangement of a connection of base body 10 and housing component 20. Base body 10 again comprises a flange 30 and housing component 20 has a mating flange 25. However, in contrast to FIG. 5, mating flange 25 does not completely overlap the entire length LA of the base body. This results in that base body 10 in region 50 abuts flush with a surface opposite mating flange 25. Thus, such a configuration offers the possibility to join base body 10 and housing component 20 not only by overlap welding 300 in the region in which the flange and mating flange are positioned opposite one another, but also by butt welding 310. Positions $P_1$ and $P_2$ of the different welding region for overlap welding 300, as well as for butt welding 310 can be adapted to the materials in the welding zone, as well as depths $TS_1$ and $TS_2$ of the welding zones. Moreover, grooves 100, 102 are worked into the base body.

FIG. 7 illustrates another exemplary arrangement of a housing part 1255 which accommodates a base body 1259. Base body and housing component are joined with one another according to the invention, in particular joined by welding. According to the invention, the materials of base body and housing component can be selected as being light metal or a light metal alloy.

It is optionally also possible to provide relief grooves as in the arrangement in FIG. 7 even though it is not illustrated. Housing 1255 has a first height or thickness $DA_1$. Base body 1259 has a second thickness $DA_2$ and a third thickness $DA_3$. Second thickness $DA_2$ designates the thickness of the base body and is consistent with glazing length EL, whereas thickness $DA_3$ is the thickness of the base body in that region in which the base body abuts the housing component. Thickness $DA_3$ corresponds to thickness $DA_1$ of the housing component. When thickness $DA^1$ of the housing component corresponds with thickness $DA^3$, housing body and housing component are aligned with each other. It is herein possible to provide more space for electronics or connections in the housing.

The uniform thickness moreover ensures that a solder and/or welding joint of the housing component with the base body is improved. This can especially be attributed to the fact that not two parts of different thickness at their ends would be joined with each other, but instead two parts—namely the housing component and the base body with substantially the same thickness. This has the advantage that during laser welding, the welding line does not need to be located in the region of the edges of parts having different thicknesses, thus making the laser welding process more effective.

Thickness $DA_2$ of base body 1259 corresponds with glazing length EL of glass material 1262 in opening 1270 of base body 1259. A conductor, in particular a pin conductor 1261 is fed through opening 1270 of base body 1259. Conductor 1261 is sealed in a glass or glass ceramic material 1262 with a glazing length EL. Thickness $DA_2$ of the base body in the center of the glazing length is selected so that a compression seal is provided. This means that base body 1259 applies a compressive force onto the glass or glass ceramic material 1262 along glazing length EL. As previously described, this is a compression seal. Since thickness $DA_3$ of the base body is substantially less than thickness $DA_2$, thermal and mechanical stress occurring during welding can be reduced. Through an appropriate choice of $DA_2$ and $DA_3$, the compressive forces acting upon the glass or glass ceramic material which are due to the different thermal coefficients of expansion can be adjusted and the thermal and mechanical stress that is due to the laser welding process can be balanced.

Base body 1259 with a flange 1260 can be produced through cold forming or as a stepped bore. Thickness $DA_3$ of the flange is between 10 and 80%, such as between 30 and 70% of thickness $DA_2$ of base body 1259. Thickness $DA_2$ can be selected between 3 mm and 8 mm, such as between 4 mm to 6 mm and thickness $DA_3$ between 0.5 mm and 3 mm, such as 1 mm and 3 mm. In addition to joining flange 1260 with base body 1259 by laser welding, a press fit or shrinking onto housing 1255 in region 1280 is conceivable. If laser welding is used as the connecting process, a hermetic seal with a helium leakage rate is less than $1 \cdot 10^{-8}$ mbar-l/sec is achieved.

According to the present invention a feedthrough and a housing component of a housing, in particular a battery housing is provided for the first time, wherein the feedthrough comprises a base body as well as a conductor that is sealed in glass into the base body. The feedthrough designed in this manner is characterized by an especially simple manufacturability and high flexibility since, due to the grooves the base body is designed in a spring-like compressible manner, which removes stresses from the glazing, in particular during welding. Through selection of materials for base body and housing component it is moreover possible to join base body and housing component with one another without crack formation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A component, comprising:
   at least two bodies comprising light metal, the at least two bodies comprising a first body comprising a light metal and a second body comprising a light metal with welding aids; and
   a welded connection established between the first body and the second body, melted material of the first body and melted material of the second body resulting in a mixture that is present in the welded connection and a content of the welding aids in the mixture is lower than a content of the welding aids in the second body.

2. The component of claim 1, wherein the second body consists of an aluminum alloy and the welding aids in the aluminum alloy are at least one of Mn, Mg, Si or Zr, wherein the welding aids amount to a total of 2 to 10 weight-% of the second body.

3. The component of claim 2, wherein the first body is a housing component with an opening to accommodate the second body.

4. The component of claim 3, wherein the opening of the housing component for accommodation of the second body has a smooth side surface and the second body is connected with the housing component in a welding region by butt welding, wherein the welding region comprises in one position a first part of the second body and a second part of the housing component.

5. The component of claim 4, wherein the position of the welding region is selected depending on an amount of welding aids in at least one of the second body or the component.

6. The component of claim 4, wherein the welding region has a depth.

7. The component of claim 6, wherein the depth of the welding region is selected depending on the content of the welding aids.

8. The component of claim 3, wherein the second body is a base body and a functional element comprising a conductor in a glass material or a glass ceramic material is fed through the base body.

9. The component of claim 8, wherein the welded connection comprises at least one of overlap welding or butt welding.

10. The component of claim 8, wherein the base body comprises a flange or a protrusion and the housing component has a cut-out or a mating flange, and the base body is connectable with the housing component in a first welding region by overlap welding and in a second welding region by butt joint welding.

11. The component of claim 10, wherein the second welding region assumes a position during overlap welding or butt joint welding, depending on an Mg or Mn content of at least one of the base body or the housing component.

12. The component of claim 11, wherein the welding region has a depth.

13. The component of claim 12, wherein the depth of the welding region is selected depending on a content of the welding aids.

14. A device, comprising:
    a base body comprising at least one opening, the base body consisting at least partially of a light metal which has a yield point greater than $40^N/mm^2$ when heated to temperatures higher than 520° C. to a maximum of 560° C. for longer than 1 to 60 minutes; and
    at least one functional element surrounded by a glass material or a glass ceramic material fed through the opening of the base body for connection with a housing consisting of a light metal.

15. An electrical device, comprising:
    a housing component with a feedthrough, the housing component comprising:
      at least two bodies comprising light metal, the at least two bodies comprising a first body comprising a light metal and a second body comprising a light metal with welding aids; and
      a welded connection established between the first body and the second body, melted material of the first body and melted material of the second body resulting in a mixture that is present in the welded connection and a content of the welding aids in the mixture is lower than a content of the welding aids in the second component.

16. A method to produce the component of claim 1, comprising the following steps:
    providing a conductor that is a substantially pin-shaped conductor and a base body;
    sealing the substantially pin-shaped conductor in a glass material or a glass ceramic material into the base body; and
    connecting a protrusion or a flange of the base body with a part of the component by welding.

17. A device, comprising:
    a base body having at least one opening, the base body having at least two of at least one of grooves or depressions by which at least one of a thermal flow through the base body is reduced or, in the event of a mechanical load on the base body, are deformable; and at least one conductor surrounded by a glass material or a glass ceramic material fed through the opening of the base body.

18. A housing, comprising:

a housing component comprising at least one opening and a cut-out or a mating flange;

a base body accommodated by the at least one opening, a part of the base body being accommodated by the cut-out or the mating flange; and at least one conductor which is fed in a glass material or a glass ceramic material through the base body.

19. A component comprising:

at least two bodies comprising light metal, the at least two bodies comprising a first body comprising a light metal and a second body comprising a light metal with welding aids, the second body comprising an opening for accommodation of a functional element and the second body consists at least partially of a light metal which has a yield point in the range of to 34 N/mm² to 400 N/mm², the second body having at least two of at least one of grooves or depressions by which at least one of a thermal flow through the second body is reduced or, in the event of a mechanical load on the second body, are deformable; and a welded connection established between the first body and the second body, melted material of the first body and melted material of the second body resulting in a mixture that is present in the welded connection and a content of the welding aids in the mixture is lower than a content of the welding aids in the second body.

20. A device, comprising:

a housing component with an opening, the housing component having a first material thickness in a region of the opening; and a feedthrough accommodated by the opening, the feedthrough comprising a glass material or a glass ceramic material, at least one conductor sealed into the glass material or the glass ceramic material, and a base body with an opening into which the conductor is sealed over a length, the base body having a second material thickness in a region of a glazing and a third material thickness in a region in which the base body is connected with the housing component, the third material thickness being less than the second material thickness, wherein the housing component has a fourth material thickness outside the region of the opening.

\* \* \* \* \*